US010576360B2

United States Patent
Quick et al.

(10) Patent No.: US 10,576,360 B2
(45) Date of Patent: Mar. 3, 2020

(54) POWERED SKATEBOARD

(71) Applicant: Globe International Nominees Pty Ltd, Port Melbourne, Victoria (AU)

(72) Inventors: Duncan Richard Quick, Snake Valley (AU); Peter Hill, Hawthorn (AU)

(73) Assignee: GLOBE INTERNATIONAL NOMINEES PTY LTD, Port Melbourne, Victoria (AU)

( * ) Notice: Subject to any disclaimer, the term of this patent is extended or adjusted under 35 U.S.C. 154(b) by 0 days.

(21) Appl. No.: 16/261,473

(22) Filed: Jan. 29, 2019

(65) Prior Publication Data
US 2019/0160366 A1 May 30, 2019

Related U.S. Application Data

(63) Continuation of application No. 15/768,304, filed as application No. PCT/IB2016/001955 on Oct. 13, 2016.
(Continued)

(51) Int. Cl.
*A63C 17/12* (2006.01)
*A63C 17/01* (2006.01)
(Continued)

(52) U.S. Cl.
CPC .............. *A63C 17/12* (2013.01); *A63C 17/01* (2013.01); *A63C 17/012* (2013.01); *A63C 17/015* (2013.01); *A63C 17/226* (2013.01); *B60B 27/0015* (2013.01); *B60B 27/0047* (2013.01); *B60B 27/06* (2013.01); *B60B 35/14* (2013.01); *B60K 1/00* (2013.01); *B60K 7/00* (2013.01); *B60K 7/0007* (2013.01); *B60L 50/00* (2019.02); *A63C 2203/12* (2013.01); *A63C 2203/14* (2013.01); *A63C 2203/22* (2013.01);
(Continued)

(58) Field of Classification Search
CPC ...................................... A63C 17/12
See application file for complete search history.

(56) References Cited

U.S. PATENT DOCUMENTS

| 3,437,161 A | 4/1969 | Ufford |
| 4,073,356 A | 2/1978 | Schlicht |

(Continued)

FOREIGN PATENT DOCUMENTS

| CN | 101257233 | 9/2008 |
| CN | 202909420 | 5/2013 |

(Continued)

OTHER PUBLICATIONS

"Boosted—The Ultimate Electric Skateboard," http://boostedboards.com/ dated Apr. 10, 2014 (per Internet Archive Wayback Machine), Accessed on May 4, 2015.
(Continued)

*Primary Examiner* — Erez Gurari
(74) *Attorney, Agent, or Firm* — Knobbe, Martens, Olson & Bear, LLP

(57) ABSTRACT

A powered skateboard having a powered wheel. The powered wheel formed of a motor within tire of the wheel. The powered wheel fixed to a truck of the powered skateboard. The powered skateboard including at least one onboard battery to provide electrical power to the powered wheel.

22 Claims, 16 Drawing Sheets

Related U.S. Application Data

(60) Provisional application No. 62/253,635, filed on Nov. 10, 2015, provisional application No. 62/242,919, filed on Oct. 16, 2015.

(51) Int. Cl.
| | |
|---|---|
| *B60K 1/00* | (2006.01) |
| *B60K 7/00* | (2006.01) |
| *B60B 27/06* | (2006.01) |
| *A63C 17/22* | (2006.01) |
| *B60B 27/00* | (2006.01) |
| *B60B 35/14* | (2006.01) |
| *B60L 50/00* | (2019.01) |

(52) U.S. Cl.
CPC .. *A63C 2203/24* (2013.01); *B60K 2007/0038* (2013.01); *B60K 2007/0092* (2013.01); *B60Y 2200/81* (2013.01)

(56) References Cited

U.S. PATENT DOCUMENTS

| | | | |
|---|---|---|---|
| 4,171,732 A | 10/1979 | Pinson | |
| 4,320,905 A * | 3/1982 | Andrew | A63C 5/03 |
| | | | 280/14.21 |
| 5,020,621 A | 6/1991 | Martin | |
| 5,330,026 A | 7/1994 | Hsu et al. | |
| 5,412,269 A | 5/1995 | Couture | |
| 5,487,441 A | 1/1996 | Endo et al. | |
| 5,893,425 A * | 4/1999 | Finkle | A63C 17/01 |
| | | | 180/180 |
| 6,050,357 A | 4/2000 | Staelin et al. | |
| 6,059,062 A | 5/2000 | Staelin et al. | |
| 6,268,720 B1 | 7/2001 | Groos | |
| 6,789,640 B1 | 9/2004 | Arling et al. | |
| 7,293,622 B1 | 11/2007 | Spital | |
| 7,466,049 B1 | 12/2008 | Vancea | |
| 7,690,452 B2 | 4/2010 | Kamen et al. | |
| 8,291,619 B2 | 10/2012 | Abadjian | |
| 8,382,148 B2 | 2/2013 | Dykema | |
| 8,419,026 B2 | 4/2013 | Piumarta | |
| D682,379 S | 5/2013 | Fox | |
| 8,556,289 B2 | 10/2013 | Luthardt | |
| 8,608,182 B2 | 12/2013 | Mete | |
| 8,807,582 B1 | 8/2014 | Piumarta | |
| 9,004,213 B2 | 4/2015 | Larson et al. | |
| 9,050,540 B1 | 6/2015 | Norman et al. | |
| 9,095,764 B2 | 8/2015 | Mete | |
| 9,126,487 B2 | 9/2015 | Henderson et al. | |
| 9,369,073 B1 | 6/2016 | Tian | |
| 9,393,483 B2 | 7/2016 | Tan | |
| 9,434,374 B2 | 9/2016 | Chan | |
| 9,442,492 B2 | 9/2016 | Kamen et al. | |
| 9,861,877 B2 | 1/2018 | Doerksen et al. | |
| 9,884,244 B1 | 2/2018 | Failing | |
| 9,902,253 B2 | 2/2018 | Gillett | |
| 9,914,043 B1 | 3/2018 | Lu et al. | |
| 9,925,452 B2 | 3/2018 | Marusiak et al. | |
| 9,950,243 B2 | 4/2018 | Evans et al. | |
| 9,987,547 B2 | 6/2018 | Ruschkowski | |
| 10,058,766 B2 | 8/2018 | Ma | |
| 10,071,303 B2 | 9/2018 | Pikulski | |
| 10,118,105 B2 | 11/2018 | Norman et al. | |
| 10,160,503 B1 * | 12/2018 | Zheng | B62D 51/02 |
| 10,175,061 B2 | 1/2019 | Savchenko | |
| 10,232,906 B2 | 3/2019 | Bieler et al. | |
| 10,245,936 B2 | 4/2019 | Gillett | |
| 10,369,454 B2 | 8/2019 | Green et al. | |
| 10,398,962 B2 | 9/2019 | Rautiainen et al. | |
| 10,398,964 B2 | 9/2019 | Long et al. | |
| 10,477,007 B2 | 11/2019 | Doolin | |
| 2004/0262056 A1 * | 12/2004 | Ying | A63C 17/01 |
| | | | 180/65.1 |
| 2004/0262884 A1 * | 12/2004 | Langford | A63C 1/36 |
| | | | 280/601 |
| 2006/0049595 A1 * | 3/2006 | Crigler | A63C 17/01 |
| | | | 280/87.042 |
| 2006/0145443 A1 * | 7/2006 | Morris | A63C 17/0093 |
| | | | 280/87.01 |
| 2006/0170174 A1 | 8/2006 | Hiramatsu | |
| 2008/0257620 A1 | 10/2008 | Poulsen | |
| 2010/0222941 A1 * | 9/2010 | Chang | A63C 17/015 |
| | | | 701/2 |
| 2010/0314851 A1 | 12/2010 | Palmer et al. | |
| 2012/0065834 A1 | 3/2012 | Senart | |
| 2012/0232734 A1 | 9/2012 | Pelletier | |
| 2013/0069331 A1 | 3/2013 | Yamada | |
| 2013/0081891 A1 | 4/2013 | Ulmen et al. | |
| 2013/0154211 A1 | 6/2013 | Mete | |
| 2013/0206493 A1 * | 8/2013 | Larson | A63C 17/12 |
| | | | 180/181 |
| 2013/0277939 A1 * | 10/2013 | Yamabe | A63C 17/012 |
| | | | 280/200 |
| 2014/0196968 A1 * | 7/2014 | Bieler | B62M 6/65 |
| | | | 180/181 |
| 2014/0262574 A1 * | 9/2014 | Rodgers | A63C 17/12 |
| | | | 180/167 |
| 2015/0076781 A1 | 3/2015 | O'Dea et al. | |
| 2015/0297975 A1 * | 10/2015 | DiCarlo | A63C 17/12 |
| | | | 180/180 |
| 2016/0039310 A1 | 2/2016 | Melvin et al. | |
| 2016/0121198 A1 | 5/2016 | Doerksen et al. | |
| 2016/0256767 A1 * | 9/2016 | Cerboneschi | A63C 17/01 |
| 2016/0276966 A1 | 9/2016 | Tian | |
| 2016/0296826 A1 * | 10/2016 | Belcher | A63C 17/12 |
| 2017/0056756 A1 | 3/2017 | Pikulski | |
| 2017/0144056 A1 * | 5/2017 | Evans | A63C 17/015 |
| 2017/0203193 A1 | 7/2017 | Powell et al. | |
| 2017/0314666 A1 | 11/2017 | Furuuchi | |
| 2017/0361203 A1 | 12/2017 | O'Rourke | |
| 2018/0015353 A1 * | 1/2018 | Green | A63C 17/12 |
| 2018/0036626 A1 * | 2/2018 | Carlson | A63C 17/12 |
| 2018/0085656 A1 | 3/2018 | Domingo | |
| 2018/0104567 A1 * | 4/2018 | Treadway | A63C 17/265 |
| 2018/0111038 A1 * | 4/2018 | Green | A63C 17/002 |
| 2018/0117449 A1 | 5/2018 | Treadway | |
| 2018/0147478 A1 | 5/2018 | Wood | |
| 2018/0178111 A1 | 6/2018 | Ma | |
| 2018/0193724 A1 | 7/2018 | King | |
| 2018/0236346 A1 * | 8/2018 | Kluge | A63C 17/01 |
| 2018/0236348 A1 | 8/2018 | Evans et al. | |
| 2018/0243638 A1 | 8/2018 | Prathamesh | |
| 2018/0250581 A1 | 9/2018 | Lemire-Elmore et al. | |
| 2018/0257486 A1 | 9/2018 | Noble Nava et al. | |
| 2018/0272891 A1 * | 9/2018 | Cerboneschi | B60L 15/00 |
| 2018/0278190 A1 * | 9/2018 | Cerboneschi | H02K 7/14 |
| 2018/0280786 A1 | 10/2018 | Wahba et al. | |
| 2018/0280787 A1 * | 10/2018 | Wahba | A63C 17/01 |
| 2018/0296906 A1 * | 10/2018 | Quick | A63C 17/01 |
| 2018/0318698 A1 * | 11/2018 | Ji | A63C 17/12 |
| 2019/0015730 A1 | 1/2019 | Pikulski | |
| 2019/0054816 A1 | 2/2019 | Garcia | |
| 2019/0061557 A1 | 2/2019 | Quick et al. | |
| 2019/0090616 A1 | 3/2019 | Price et al. | |
| 2019/0091551 A1 | 3/2019 | Rautiainen et al. | |
| 2019/0091552 A1 | 3/2019 | Bluhm et al. | |
| 2019/0091553 A1 | 3/2019 | Rautiainen et al. | |
| 2019/0091554 A1 | 3/2019 | Rautiainen et al. | |
| 2019/0111330 A1 | 4/2019 | Anning | |
| 2019/0184265 A1 | 6/2019 | Micacchi | |
| 2019/0232623 A1 | 8/2019 | Meyer et al. | |
| 2019/0290996 A1 | 9/2019 | Quick et al. | |
| 2019/0321711 A1 | 10/2019 | Rautiainen et al. | |

FOREIGN PATENT DOCUMENTS

| | | |
|---|---|---|
| CN | 103170122 A | 6/2013 |
| CN | 105288988 | 2/2016 |
| CN | 105381594 A | 3/2016 |
| CN | 105797358 | 7/2016 |
| CN | 205659382 U | 10/2016 |
| CN | 205659385 U | 10/2016 |
| CN | 205659387 U | 10/2016 |

(56) References Cited

FOREIGN PATENT DOCUMENTS

| | | |
|---|---|---|
| CN | 106255536 A | 12/2016 |
| CN | 106433037 | 2/2017 |
| CN | 106608051 A | 5/2017 |
| CN | 106655562 A | 5/2017 |
| CN | 207753528 | 1/2018 |
| CN | 107837526 A | 3/2018 |
| CN | 207060266 | 3/2018 |
| CN | 207085270 U | 3/2018 |
| CN | 207085271 U | 3/2018 |
| CN | 207129083 | 3/2018 |
| CN | 207141264 | 3/2018 |
| CN | 207157383 U | 3/2018 |
| CN | 108358637 | 4/2018 |
| CN | 108358638 | 4/2018 |
| CN | 207191297 U | 4/2018 |
| CN | 207203404 U | 4/2018 |
| CN | 207203405 U | 4/2018 |
| CN | 108001237 A | 5/2018 |
| CN | 108014485 A | 5/2018 |
| CN | 108016541 A | 5/2018 |
| CN | 207307139 U | 5/2018 |
| CN | 207342162 U | 5/2018 |
| CN | 108213402 A | 6/2018 |
| CN | 207450183 U | 6/2018 |
| CN | 207506957 U | 6/2018 |
| CN | 207520577 U | 6/2018 |
| CN | 108236780 | 7/2018 |
| CN | 207562316 U | 7/2018 |
| CN | 207575728 U | 7/2018 |
| CN | 207595157 U | 7/2018 |
| CN | 207640933 U | 7/2018 |
| CN | 108409326 A | 8/2018 |
| CN | 207753528 U | 8/2018 |
| CN | 207871476 U | 9/2018 |
| CN | 107261472 B | 10/2018 |
| CN | 108654067 A | 10/2018 |
| CN | 108671531 A | 10/2018 |
| CN | 108854038 | 11/2018 |
| CN | 208159068 U | 11/2018 |
| CN | 109069912 A | 12/2018 |
| CN | 208244068 U | 12/2018 |
| CN | 109107139 A | 1/2019 |
| CN | 208372443 U | 1/2019 |
| CN | 208553078 U | 3/2019 |
| CN | 109649560 A | 4/2019 |
| CN | 108236780 B | 7/2019 |
| CN | 110315783 A | 10/2019 |
| CN | 110393908 A | 11/2019 |
| EP | 0337032 | 10/1989 |
| WO | WO 1998/046474 | 10/1998 |
| WO | WO 2013/149130 | 10/2013 |
| WO | WO 2014/108275 | 7/2014 |
| WO | WO 2016/162750 | 10/2016 |

OTHER PUBLICATIONS

"Evolve—Electric Longboards & Motorised Skateboards Australia," http://www.evolveskateboards.com.au/ dated Jun. 25, 2014 (per Internet Archive Wayback Machine), Accessed on May 4, 2015.

"Inboard," http://www.inboardskate.com/ dated Apr. 12, 2015 (per Internet Archive Wayback Machine), Accessed on May 4, 2015.

"Yuneec E-GO Electric Skateboard by Yuneec," http://store.yuneec.com/us/e-go.html dated Mar. 19, 2015 (per Internet Archive Wayback Machine), Accessed on May 4, 2015.

"ZBoard 2," http://www.zboardshop.com, available on or before Oct. 15, 2015 (per Internet Archive Wayback Machine, https://web.archive.org/web/20151015020658/http://www.zboardshop.com/), accessed on Feb. 11, 2019.

Supplementary European Search Report for Application No. EP 16 85 5017 dated May 15, 2019.

Supplementary European Search Report for Application No. EP 16 86 3741 dated May 16, 2019.

International Search Report for International Application No. PCT/IB2016/001955 dated Apr. 5, 2017.

International Search Report for International Application No. PCT/IB2016/001960 dated May 5, 2017.

* cited by examiner

POWERED SKATEBOARD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure relates to electric vehicles. In particular, it relates to a motorized wheel assembly for a vehicle.

Description

Lightweight personal vehicles, such as skateboards, scooters, roller skates, and others are common for recreational use and transportation. These vehicles are commonly non-motorized, requiring the user to provide the power for motion. Several motorized personal vehicles have been developed. For example, some commercially available motorized skateboards use a motor and a toothed belt to drive one or two wheels. Additionally, motorized skateboards that include motorized wheels, such as hub mounted motors, are being developed.

SUMMARY

According to this disclosure, a motorized vehicle assembly includes one or more of the following: an axle comprising a channel extending along a central axis of the axle; a socket positioned within the channel of the axle; and/or a motorized wheel configured to be mounted on an end the axle. According to this disclosure, the motorized wheel includes one or more of the following: a boss configured to engage the end of the axle when the motorized wheel is mounted on the axle; an electric motor; a tire mounted on the rotor; and/or a plug positioned within the boss, the plug configured to engage with the socket when the motorized wheel is mounted on the axle. According to this disclosure, the electric motor includes one or more of the following: a stator fixed to the boss; and a rotor surrounding the stator, the rotor configured to rotate relative to the stator. The electric motor is configured to cause the rotor to rotate relative to the stator to cause the tire to rotate.

According to this disclosure, the assembly further comprises one or more of the following: the plug comprises prongs and the socket comprises receptacles, and/or wherein the prongs are configured to be received within the receptacles; a hanger, wherein the hanger supports the axle, and/or wherein the hanger comprises a channel formed therein, the channel of the hanger connected to the channel of the axle; the channel of the axle and the channel of the hanger form a continuous duct; a truck, the truck resiliently connected to the hanger by a kingpin; the truck comprising a surface configured to mount to the motorized vehicle, the surface including an opening formed therein, and/or a channel extending through the truck from the opening, wherein the channel of the truck is connected to the channel of the hanger; the channel of the axle, the channel of the hanger, and/or the channel of the truck form a continuous duct; wiring extending through the duct and connecting to the socket; the wiring is internally housed within the continuous duct of the axle, hanger, and/or the truck; the wiring is further connected to a battery in the motorized vehicle; the hanger further comprises a hollow pivot tube, and wherein the channel of the hanger extends through the hollow pivot tube; the truck further comprises a hollow pivot bushing, and wherein the channel of the truck extends through the hollow pivot bushing; a bore, a groove formed in an outer surface of the portion of the boss, and/or a pin configured in size and shape to be inserted into the bore, wherein, when the motorized wheel is mounted to the axle, the pin is inserted into the bore and is at least partially received within the groove; a receiving space formed in the truck, the receiving space positioned to receive a portion of the boss therein when the motorized wheel is mounted on the axle, a bore extending at least partially into the truck, the bore intersecting the receiving space, a groove formed in an outer surface of the portion of the boss, and/or a pin configured in size and shape to be inserted into bore, wherein, when the motorized wheel is mounted to the axle, the pin is inserted into the bore and is at least partially received within the groove; when the pin is at least partially received within the groove, the motorized wheel is retained on the axle; the motorized wheel further comprises an inner bearing positioned on the boss, an inner bell end positioned on the inner bearing, the inner bell end further connected to the rotor, wherein the portion of the boss extends outwardly away from the inner bearing and the inner bell end; a portion of the pin is threaded, a portion of the bore is threaded, and the threaded portion of the pin is configured to engage the threaded portion of the bore; the groove extends in a direction that is perpendicular to the central axis; a projection extending from an inner surface of the boss, and/or a slot formed in the end of the axle, wherein the slot is configured to receive the projection when the motorized wheel is mounted on the axle; the slot and projection are positioned to rotationally align the motorized wheel to axle around the central axis; the slot extends from an end of the axle along a direction parallel to the central axis; the projection comprises a grub screw extending through an opening in the axle; the projection extends from an inner surface of the portion of the boss; the motorized wheel further comprises an outer bell end connected to the rotor, the outer bell end including an opening, an outer bearing positioned on the boss, the outer bearing received with the opening of the outer bell end and/or a retainer configured to removably engage with the boss, the retainer including a flange that secures the outer bearing within the opening of the outer bell end; the retainer includes a threaded portion that engages with a threaded portion of the end of the boss; the outer bell end includes a flange surrounding the opening, and/or wherein the outer bearing is positioned between the flange of the outer bell end and the flange of the retainer; the motorized wheel further comprises a quick release mechanism configured for mounting the motorized wheel to the axle, the quick release mechanism comprising a single fastener actuable to mount the motorized wheel to the axle; the quick release mechanism further comprises a locking plate, the single fastener extending through the locking plate along the central axis, wherein advancing the single fastener causes displacement of a retaining ball in a direction perpendicular to the central axis; the end of the axle further comprises an opening through a wall of the axle, wherein advancing the single fastener causes displacement of the retaining ball at least partially into the opening in the axle; the locking plate comprises a cylindrical projection extending along the central axis and configured to be at least partially received within the boss or axle, wherein the retaining balls are disposed within the cylindrical projection and configured to be displaced radially outward by the fastener; the boss further comprises a divot that radially aligns with the opening through the wall of the axle, the divot positioned radially further from the central axis relative to the opening of wherein advancing the single fastener causes displacement of the retaining ball at least partially into the divot; the quick release mechanism further comprises a retainer, wherein the retainer is positioned between the locking plate and the tire, and/or wherein the retainer secures the tire onto the electric motor; the quick release mechanism further comprises a thrust bearing positioned between the locking plate and the retainer, and wherein the thrust bearing allows rotation of the retainer relative to the locking plate; the thrust bearing comprises a flat ring with roller bearings disposed thereon; the roller bearings contact a surface of the locking plate and a surface of the retainer when the thrust bearing is positioned therebetween; the locking plate comprises a channel, the retainer comprises a channel, and the thrust bearing is received within the channel of the locking plate and the channel of the retainer; and/or the motorized vehicle is a skateboard.

According to this disclosure, an axle assembly for a motorized wheel includes one or more of the following: a hanger having a channel formed there through; and/or an axle supported by the hanger, the axle having a channel formed therein. The channel of the hanger and the channel of the axle are connected to form a continuous duct.

According to this disclosure, an axle assembly further includes one or more of the following: a truck, the truck resiliently connected to the hanger by a kingpin; the truck including a surface configured to mount to a vehicle, the surface including an opening formed therein, and a channel extending through the truck from the opening, wherein the channel of the truck is connected to the channel of the hanger, and wherein the channel of the truck forms part of the continuous duct; the hanger further comprises a hollow pivot tube, wherein the channel of the hanger extends through the hollow pivot tube; the truck includes a hollow pivot bushing, wherein the channel of the truck extends through the hollow pivot bushing; at least a portion of the hollow pivot tube is received within the hollow pivot bushing; the duct forms a passageway for wiring between the vehicle and the axle; a socket positioned within the channel of the axle, wherein the wiring is connected to the socket, and wherein the socket is configured to connect to a motorized wheel to power the motorized wheel; and/or the socket comprises a receptacle configured to receive a prong of the motorized wheel to provide an electrical connection between the wiring and the motorized wheel.

According to this disclosure, a motorized wheel includes one or more of the following: a boss configured to engage an end of an axle when the motorized wheel is mounted on the axle; an electric motor; and/or a plug positioned within the boss, the plug in electrical communication with the electric motor, the plug configured to engage with a socket in the axle when the motorized wheel is mounted on the axle to provide electrical communication between the socket and the electric motor.

According to this disclosure, the motorized wheel of Claim 45, further includes one or more of the following: a portion of the boss configured to be received within a receiving space formed in a hanger hen the motorized wheel is mounted on the axle; a groove formed in an outer surface of the portion of the boss; the grove is configured to at least partially engage a pin when the motorized wheel is mounted to the axle to retain the motorized wheel on the axle; when the pin is at least partially engaged within the groove, the pin extends through a bore that at least partially extends into the hanger; the motorized wheel further includes an inner bearing positioned on the boss, an inner bell end positioned on the inner bearing, the inner bell end further connected to the rotor, wherein the portion of the boss extends outwardly away from the inner bearing and the inner bell end; the groove extends in a direction that is perpendicular to the central axis; a projection extending from an inner surface of the boss, wherein the projection is configured to be received within a slot on the axle when the motorized wheel is mounted on the axle; the slot and projection are positioned to rotationally align the motorized wheel to axle around the central axis; the projection comprises a grub screw extending through an opening in the axle; the projection extends from an inner surface of the portion of the boss; a quick release mechanism, the quick release mechanism comprising a fastener actuable to mount the motorized wheel to the axle; the quick release mechanism further includes a locking plate, the fastener extending through the locking plate along an axis, wherein advancing the fastener causes displacement of retaining ball in a direction perpendicular to the axis, wherein the retaining ball is configured to engage with an opening through a wall in an end of the axle; the locking plate comprises a cylindrical projection extending along the central axis and configured to be at least partially received within the boss or axle, wherein the retaining balls are disposed within the cylindrical projection and configured to be displaced radially outward by the fastener; the boss further comprises a divot that radially aligns with the opening through the wall of the axle, the divot positioned radially further from the central axis relative to the opening of wherein advancing the single fastener causes displacement of the retaining ball at least partially into the divot; the quick release mechanism further comprises a retainer, wherein the retainer is positioned between the locking plate and the tire, and wherein the retainer secures the tire onto the electric motor; the quick release mechanism further comprises a thrust bearing positioned between the locking plate and the retainer, and wherein the thrust bearing allows rotation of the retainer relative to the locking plate; the thrust bearing comprises a flat ring with roller bearings disposed thereon; the roller bearings contact a surface of the locking plate and a surface of the retainer when the thrust bearing is positioned therebetween; the locking plate comprises a channel, the retainer comprises a channel, and the thrust bearing is received within the channel of the locking plate and the channel of the retainer; and/or the fastener comprises a single fastener.

According to this disclosure, a motorized wheel with a quick release mechanism includes one or more of the following: an electric motor; and/or a fastener actuable to mount the motorized wheel to the axle.

According to this disclosure the motorized wheel further includes one or more of the following: the axle is mounted on a hanger; the quick release mechanism further includes a bore extending into the hanger, and a groove on a boss of the electric motor, wherein the fastener comprises a pin configured to be received within the bore and at least partially within the groove; the quick release mechanism further includes a locking plate, the fastener extending through the locking plate along an axis, wherein advancing the fastener causes displacement of retaining ball in a direction perpendicular to the axis; a retainer, wherein the retainer is positioned between the locking plate and the tire, and wherein the retainer secures the tire onto the electric motor; and/or a thrust bearing positioned between the locking plate and the retainer, and wherein the thrust bearing allows rotation of the retainer relative to the locking plate.

According to this disclosure, a method for securing a motorized wheel to an axle mounted in a hanger includes one or more of the following: mounting a motorized wheel on an axle; and/or inserting a pin through a bore in a hanger such that the pin engages a groove on the motorized wheel.

According to this disclosure, the method further includes one or more of the following: aligning a projection on the motorized wheel with a slot on the axle; mounting the motorized wheel on the axle comprises sliding a boss of the motorized wheel on the axle such that the projection slides along the slot.

According to this disclosure, a method of manufacturing a motorized wheel assembly includes one or more of the following: positioning a socket within a channel of an axle; and/or routing wiring through the channel of the axle to the socket.

According to this disclosure the method further includes one or more of the following: attaching the axle to a hanger having a channel formed in the hanger, wherein the channel of the axle and the channel of the hanger are connected to form a continuous duct; routing the wiring through the channel of the hanger; attaching the hanger to a truck with a kingpin, the truck having a channel formed in the truck, wherein the continuous duct includes the channel of the truck; routing the wiring through the channel of the truck; attaching the truck to a vehicle; routing the wiring to a battery positioned on or within the vehicle; the vehicle is a skateboard and said attached the truck to the vehicle comprises attaching the truck to a deck of the skateboard; positioning a plug within a boss of a motorized wheel comprising an electric motor, the boss configured to be mounted, the plug connected to the electric motor; and/or mounting the boss on the axle such that the plug engages the socket to form an electrical connection between the electric motor and the wiring.

According to this disclosure, a method for manufacturing a motorized wheel includes one or more of the following: fixedly attaching a stator to a boss such that the stator surrounds the boss, the boss configured to mount to an axle of a vehicle; positioning a rotor around the stator, the rotor configured to rotate relative to the stator; and/or positioning a plug within the boss, the plug electrically connected to coils of the stator.

According to this disclosure the method further can further include mounting a tire onto the rotor.

According to this disclosure, a motorized skateboard includes one or more of the following: a deck; a truck connected to the deck; a hanger attached to the truck by a kingpin; an axle supported by the hanger; a wheel connected to the axle, the wheel including a tire mounted on an electric motor such that the electric motor drives the tire; a battery mounted proximal to the deck; and/or wiring connecting the battery to the electric motor, wherein the wiring is routed from the battery to the electric motor entirely inside the axle, hanger, truck, and deck.

According to this disclosure, the skateboard further includes one or more of the following: the hanger further comprises a hollow pivot tube, wherein the wiring is routed through the hollow pivot tube; the hanger further comprising one or more channels formed therein, the one or more channels functioning as cable ducts for routing the wiring; the axle further comprising one or more channels formed therein, the one or more channels functioning as cable ducts for routing the wiring; the truck further comprising one or more channels formed therein, the one or more channels functioning as cable ducts for routing the wiring; and/or the wiring is not externally visible.

According to this disclosure, an electric motorized skateboard includes one or more of the following a deck, truck, hanger, axle and/or a motorized wheel, wherein the wheel is removably mounted on the axle by a quick release mechanism.

According to this disclosure the skateboard further includes one or more of the following: the quick release mechanism comprises a single fastener; a thrust bearing and a retainer, wherein the retainer bears against the thrust bearing to retain the tire on the wheel; the fastener is selected from the set comprising bolts, thumbscrews, and grub screws; loosening of the fastener permits the quick and easy removal of the wheel from the skateboard without the use of other tools, nor the separate manual disconnection of any wiring connectors; the quick release mechanism comprises a retaining projection configured to extend radially toward the axle when the fastener is engaged with the wheel.

According to this disclosure, a hanger for an electric skateboard includes one or more of the following: a pivot tube; and/or a kingpin; the pivot tube and the hanger are both fitted with passages for the routing of services, the kingpin serves to carry at least a portion of the mechanical load, and the pivot tube serves to carry the services, and to restrict the locus of travel of the hanger around the kingpin, such that the hanger forms a steering mechanism for the skateboard. The hanger may further include the services comprise at least one of liquid coolant, air, or electrical cables.

According to this disclosure, a motorized vehicle assembly includes one or more of the following: a hanger; a wheel connected to the hanger via a fastener; and/or an electric motor connected to the wheel, the electric motor configured to turn the wheel relative to the hanger; the wheel can be disconnected from the hanger after disengaging the fastener.

According to this disclosure, the assembly may further include one or more of the following: the fastener comprises a pin, and wherein disengaging the fastener comprises removing the pin from a bore; disengaging the fastener comprises turning the fastener relative to the hanger; disengaging the fastener disengages connections axially securing the wheel to the hanger; an axle connecting the wheel to the hanger, wherein disengaging the fastener comprises disengaging the wheel from the axle.

According to this disclosure, a motorized wheel mounting assembly includes one or more of the following: a hanger comprising a conduit configured to accept an electrical wire; and/or the electrical wire is configured to power a motorized wheel configured to connect to the hanger.

According to this disclosure, the assembly may further include one or more of the following: a pivot connected to the hanger, the pivot comprising a conduit configured to accept the electrical wire, the conduit of the pivot connected to the conduit of the hanger; and/or a truck connected to the hanger, the truck configured to connect to a vehicle and comprising a conduit configured to accept the electrical wires, the conduit of the truck connected to the conduit of the hanger.

The foregoing is a summary and contains simplifications, generalization, and omissions of detail. Those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

BRIEF DESCRIPTION OF THE DRAWINGS

The foregoing and other features of the present disclosure will become more fully apparent from the following description, taken in conjunction with the accompanying drawings. Understanding that these drawings depict only several embodiments in accordance with the disclosure and are not, therefore, to be considered limiting of its scope, the disclosure will be described with additional specificity and detail through use of the accompanying drawings.

DETAILED DESCRIPTION

Figure 1:
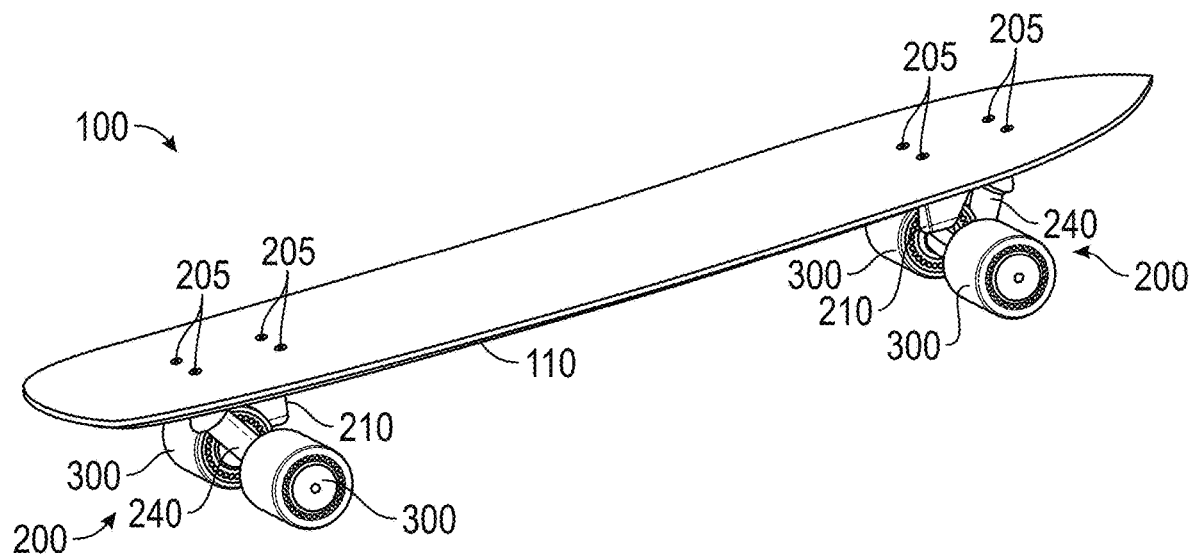
FIG. 1 is a top perspective view of an embodiment of a motorized skateboard.

In the following detailed description, reference is made to the accompanying drawings, which form a part hereof. In the drawings, similar symbols typically identify similar components, unless context dictates otherwise. The illustrative embodiments described in the detailed description and the drawings are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, and designed in a wide variety of different configurations, all of which are explicitly contemplated and made a part of this disclosure.

This disclosure relates to motorized wheel assemblies, electric vehicles including the same, and associated methods of use and manufacture. Although described primarily in the context of a skateboard, the motorized wheel assemblies described herein can be used in many types of electric vehicles, including road luges, roller skates, inline skates, and small wheeled scooters, among many others. In some embodiments, the motorized wheel assemblies can include one or more motorized wheels. In some embodiments, the motorized wheel includes a tire mounted on an electric motor, such that the electric motor serves as the hub for the tire and drives the tire directly.

In some embodiments, the motorized wheel assemblies are configured for quick release and/or quick connect. As used herein, "quick release" and/or "quick connect" is intended to signify that a wheel of the motorized wheel assembly can be removed and/or replaced easily, such as, without tools, with commonly available tools (in other words, with non-specialized tools), with minimal tooling, by a user, without requiring substantial specialized knowledge, training, or instruction. In some embodiments, a quick release motorized wheel (having a quick release mechanism as discussed herein) can be removed and/or replaced by a user without requiring the vehicle to be shipped back to the manufacturer or a specialized repair shop. As used herein, the terms "quick release" and "quick connect" are each intended to refer to system for engaging and disengaging a wheel to a motorized wheel assembly.

As will be described in greater detail below, in some embodiments, a quick release motorized wheel can also include electrical connections (for example, between the electrical components of the wheel and other electrical components located elsewhere on the vehicle) that do not require direct handling. That is, in some embodiments, removal of a quick release motorized wheel can also disconnect an electrical connection between the motorized wheel and the vehicle without requiring a user to separately handle the electrical connection, and attachment of the motorized wheel to the vehicle (for example, replacement of the motorized wheel) can also connect the electrical connection between the motorized wheel and the vehicle without requiring the user to separately handle the electrical connection. In some embodiments, motorized wheel assemblies include an integral plug and socket. In some embodiments, the plug can be fitted coaxially in the motor's hollow shaft. When the motor is slid onto the axle, the plug can automatically engage with the socket fitted inside the hollow axle. Accordingly, in some embodiments, the user does not need to take special action to connect the electrical plug to the socket.

In some embodiments, the motorized wheel assemblies disclosed herein are configured to eliminate or minimize external wiring between a motorized wheel and an electric vehicle. For example, in some embodiments, wiring providing the electrical connection between electrical components of a motorized wheel and additional electrical components of an electric vehicle may be routed through the interior structures connecting the motorized wheel to the electric vehicle. In some embodiments where the vehicle is a skateboard, the wiring between electrical components stored in, on, or below the deck of the skateboard (or elsewhere) can be routed to a motorized wheel through ducts that extend through the interior of the truck, hanger, and axle connecting the motorized wheel to the deck. In some embodiments, the ducts are wholly internal. In some embodiments, the ducts are partially internal. In some embodiments, the ducts extend through the pivot tube of the hanger. As used herein ducts can refer to hollows, channels, conduits, passageways, pipes, pipelines, tubes, tunnels, grooves, etc. of any suitable shape and size to allow for passage and protection of electrical wiring.

Most existing electric skateboards have their motors supported from the hanger by a bracket and drive the wheels using a toothed belt. Some have the motors mounted inside the wheels as hub motors. Regardless of the type of drive system, most skateboards (including non-powered skateboards) have resiliently mounted hangers and trucks fixed to the deck. Because the hanger is resiliently mounted, this configuration allows steering of the skateboard by means of shifting the rider's weight laterally. Existing motorized skateboards traditionally use flying wiring (in other words, wiring that is routed at least partially through the air) to route the wires from the electric motors that power the wheels to the deck, where the electronic speed controllers (ESCs), batteries, and other electronics are normally located. Such flying wiring typically leaves the hanger or deck below the deck and is therefore exposed to road debris and potential damage. Such wiring typically is run in flexible cable, usually protected by a mesh sleeve. Such wiring can be subject to rapid flexing at a high cycle rate, due to the movement of the hanger relative to the deck when turning, wobbling in a straight line, or moving over uneven ground. Over time this can fatigue the wiring, causing failure.

Further, existing motorized skateboards do not have a quick release wheels, and therefore suffer from several disadvantages. For example, most existing motorized skateboards have to be returned to the dealer or manufacturer for even typically simple servicing. On most, a user cannot even change the bearings or wheels easily, without mechanical skills and/or special tools. This is in contrast to the easy bearing or wheel replacement possible on unpowered, conventional skateboards, which can be performed by even novice users. Existing motorized skateboards either do not allow for replacement or do not include the necessary tools to replace the bearings and wheels, since it is intended that the bearings and wheels be replaced by the vendor, not the user, unlike non-motorized skateboards that allow the user to change their own bearings and wheels. Additionally, for most existing motorized skateboards motor replacement is beyond the capability of most users.

Most existing electric skateboards provide plugs and sockets for connecting the motor wiring. A user generally needs to handle these directly to connect and/or disconnect the electrical connections. This can expose the user to electric shock and can damage the electrical components if connected improperly. Some exiting electric skateboards solder the motor wires directly to the electronics in the deck, making motor replacement difficult and beyond capability of most users.

As noted previously, some embodiments of motorized wheel assemblies disclosed herein include quick release motorized wheels that reduce or eliminate the need for the user to own specialized tools and handle electrical connections in order to replace motors, tires, wheels, and bearings. For example, in some embodiments disclosed herein, a quick release motorized wheel is removable without tools, or with a single bolt or key. In some embodiments, components of the motorized wheel can also be relatively easily removed and replaced by the user, including the motor, both wheel bearings, and the tire. Further, in some embodiments, the motorized wheel assembly includes a captive plug and socket to provide the electrical connections, so that the user is not required to handle, align, and seat the plugs and sockets.

Thus, in some embodiments, the motorized wheel assemblies disclosed herein provide several notable advantages over existing motorized skateboards, some of which are described below. For example, in some embodiments, a quick release motorized wheel assembly reduces or eliminates the need for the user to own specialized tools and/or handle electrical connections, in order to, for example, replace motors, tires, wheels, and/or bearings or perform other maintenance. Further, in some embodiments, a motorized wheel assembly can hide and protect the wiring over a portion, substantially all, or all of the wiring's length, by using a hanger and truck with a hollow pivot tube and a hollow or recessed hanger to allow passage of the wiring. In some embodiments, a motorized wheel assembly does not require adding a separate conduit, which can mitigate the cost and weight.

In some embodiments, electric vehicles with other electrical components, such as LED lights on the wheels, electric brakes, cooling systems, etc., can also use features of embodiments disclosed herein. For example, wiring for these additional electrical components can be run through the truck, hanger, and axle as described herein. In some embodiments, skateboards that include motorized wheels with cooling systems can use the ducts through the truck, hanger, and axle for coolant hoses, in addition to electrical wiring.

In some embodiments, an advantage of routing the wiring through the pivot tube can be that the wires are then exposed to torsion, not bending. This can allow for the use of larger and stiffer wiring, which may not suffer from the limited number of bending cycles before cracking, as bending wiring does.

In some embodiments, another advantage of hiding the wiring over its entire or substantially entire length can be that the skateboard does not appear to be electrified or motorized, allowing the electric board to be mistaken for a non-electric board. Users may see this as an advantage.

In some embodiments, motorized wheel assemblies that include quick release features can easily and quickly allow a user to replace the motors (or motorized wheels) with higher or lower power motors (or motorized wheels), or with unpowered wheels, without having to change the hanger, truck, and/or board or ship the board to the dealer or manufacturer. For example, a motorized skateboard can be sold as a basic board with a cheaper or less powerful motors, and a user can change or upgrade motors if desired. This can allow the board to be easily upgraded. As another example, in the event of a motor or wheel failure of any kind, the user can easily remove the faulty wheel and mail it to the retailer for replacement or repair. Thus, advantageously, in some embodiments, there is no need to return the whole board in the event of a faulty motor or wheel. Further quick release replaceable wheels allow for the carrying of a spare wheel or motor, and changing in the field without any tools or with minimal tooling.

In some embodiments, an additional advantage can be that improper connection of the plug and socket is eliminated or minimized. For example, in some embodiments disclosed herein, there are no plugs to handle and get backwards and no live pins to accidentally touch, making the system simpler and safer.

In some embodiments, another advantage can be that the motor is secured to the axle when the plug and socket are fully or substantially fully engaged. Full engagement can help ensure a partly connected plug cannot arc and damage itself or cause the motor to stop.

These and other features and advantages present in some embodiments according to the present disclosure will become more apparent from the following description of certain non-limiting embodiments shown in the figures.

Figure 2:
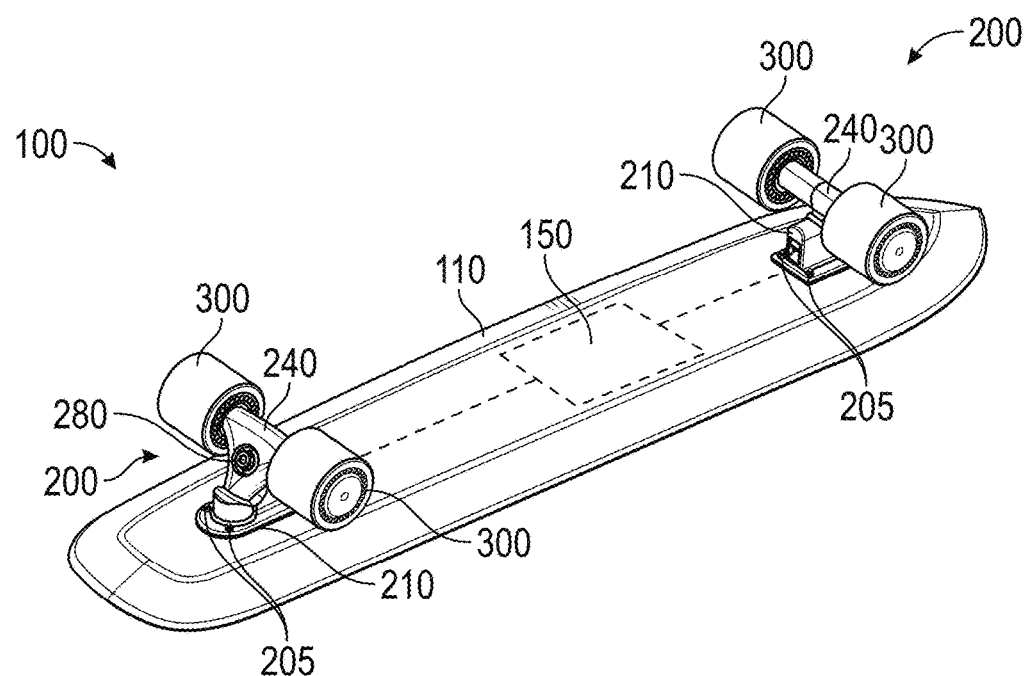
FIG. 2 is a bottom perspective view of the motorized skateboard of FIG. 1.

FIGS. 1 and 2 show top and bottom perspective views, respectively, of an embodiment of a motorized skateboard 100, or other vehicles as discussed herein. In the illustrated embodiment, the motorized skateboard 100 includes a deck 110 and front and back motorized wheel assemblies 200. Although illustrated with both front and back motorized wheel assemblies 200, in some embodiments, either the front or back motorized wheel assembly 200 can be replaced with a non-motorized wheel assembly. In some embodiments, a non-motorized wheel assembly can be a wheel assembly (in other words, truck, hanger, axle, and wheels) as used in conventional non-powered skateboards. Accordingly, in some embodiments, the motorized skateboard 100 can be front-wheel drive, rear-wheel drive, or all-wheel drive. An embodiment of a motorized wheel assembly 200 is shown in greater detail in FIGS. 4 and 5, which are described below.

Figure 5:
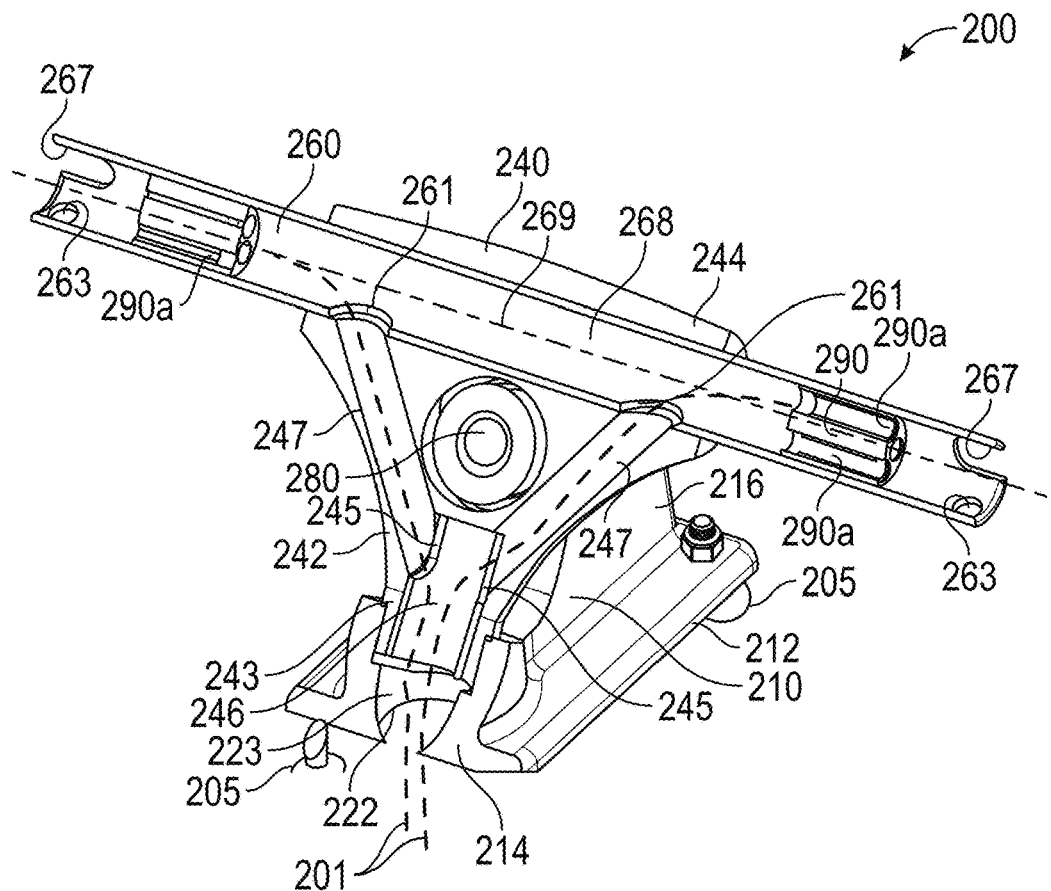
FIG. 5 is a transverse sectional view of the motorized wheel assembly of FIG. 3.

In the illustrated embodiment, the motorized wheel assemblies 200 each include a truck 210, a hanger 240, and two motorized wheels 300 mounted on an axle 260 (the axle 260 is shown, for example, in FIG. 5). Although each wheel assembly 200 is illustrated as including two motorized wheels 300, in some embodiments, one or both of the motorized wheels 300 can be replaced with non-motorized wheels. A non-motorized wheel can include a wheel as used in a conventional, non-powered skateboard or an idler wheel, which that does not include a rotor, stator, and/or magnets. Accordingly, in some embodiments, the motorized skateboard 100 includes one, two, three, or four motorized wheels 300, depending on the user's requirements or desire for speed and acceleration versus battery and motor weight, and the remaining wheels may be non-motorized wheels. In some embodiments, a user may modify or alter the motorized skateboard 100 after purchase to include less or more motorized wheels 300. In some embodiments, the motorized wheels 300 have substantially the same appearance as non-motorized wheels. Embodiments of motorized wheels 300 are shown in greater detail in FIGS. 8A-11 and 14, which are described below.

As shown in FIGS. 1 and 2, the motorized wheel assemblies 200, including motorized wheels 300, are mounted below the deck 110. The trucks 210 are connected to the deck 110 by mounting hardware 205. In the illustrated embodiment, the mounting hardware 205 includes four nuts and bolts for each motorized wheel assembly 200, although other types of mounting fasteners may be used. In some embodiments, the mounting hardware 205 may be similar to or the same as hardware used to mount trucks in conventional skateboards. As best seen on the back motorized wheel assembly 200 in FIG. 2, the hangers 240 are connected to the trucks 210 by a kingpin 280. In some embodiments, the hangers 240 are resiliently connected to the trucks 210 by the kingpin 280 such that the motorized wheel assemblies 200 are steerable in a manner similar to conventional skateboards (in other words, steerable by a user shifting his or her weight laterally). The axle 260 extends through the hanger 240 (see FIG. 5) and the motorized wheels 300 are mounted on the axle 260 on opposite sides of the hanger 240. In some embodiments, the motorized wheel assemblies 200 have an appearance substantially similar to the trucks, hangers, and wheels, used in conventional skateboards, such that the motorization of the motorized skateboard 100 is not readily apparent.

Various components 150 for the motorized skateboard can be mounted on, below, or within the deck 110. In the illustrated embodiment, the components 150 are represented by the dashed lines shown on the bottom surface of the deck 110. In some embodiments, the components 150 are positioned within the deck 110. The components 150 can be accessible by one or more hatches in the top and/or bottom surfaces of the deck 110. The components 150 may include batteries, electronic speed controllers (ESCs), a main controller, operator interfaces, radio interfaces, braking resistors, wiring harnesses, cooling system components, and/or other electronic components. As illustrated in FIGS. 1 and 2, the components 150 are housed inside the deck 110, making their appearance non-obvious to a viewer. In some embodiments, the deck 110 comprises a tapered boat hull shape (for example, as shown in FIG. 2). In some embodiments, a tapered boat hull shaped deck 110 can provide sufficient space within the deck 110 for the components 150, while still having the appearance of a non-motorized skateboard. The shape of the deck 110 can take many other forms and is not limited to the shapes disclosed herein.

In the embodiment illustrated in FIGS. 1 and 2, wiring connecting the motorized wheels 300 to the components 150 is not visible because it is not external or substantially not external to the motorized skateboard. That is, the wiring connecting the motorized wheels 300 to the components 150 runs internal or substantially internal to the deck 110, through the motorized wheel assemblies 200, and into the motorized wheels 300. Thus, in some embodiments, the motorized skateboard 100 does not include flying wiring that is exposed to road debris, damage, and substantial bending forces. Further, because the wiring is not external, it may not provide any indication that the motorized skateboard 100 is powered.

In some embodiments, the motorized wheel assemblies 200 are configured (as will be described below) such that the motorized wheels 300 offer quick release. That is, in some embodiments, the motorized wheels 300 can be removed and/or replaced easily, such as, without tools, with commonly available tools (in other words, with non-specialized tools), with minimal tooling, by a user, without requiring substantial specialized knowledge, training, or instruction. In some embodiments, the motorized wheel assemblies 200 are configured (as will be described below) to simplify the electrical connection (and/or connections to other services, such as cooling systems or hydraulic systems) between the motorized wheels 300 and the components 150, for example, by including integral plugs and sockets that are connected or disconnected automatically when the motorized wheels 300 are attached or remoted to the motorized wheel assemblies 200.

Figure 3:
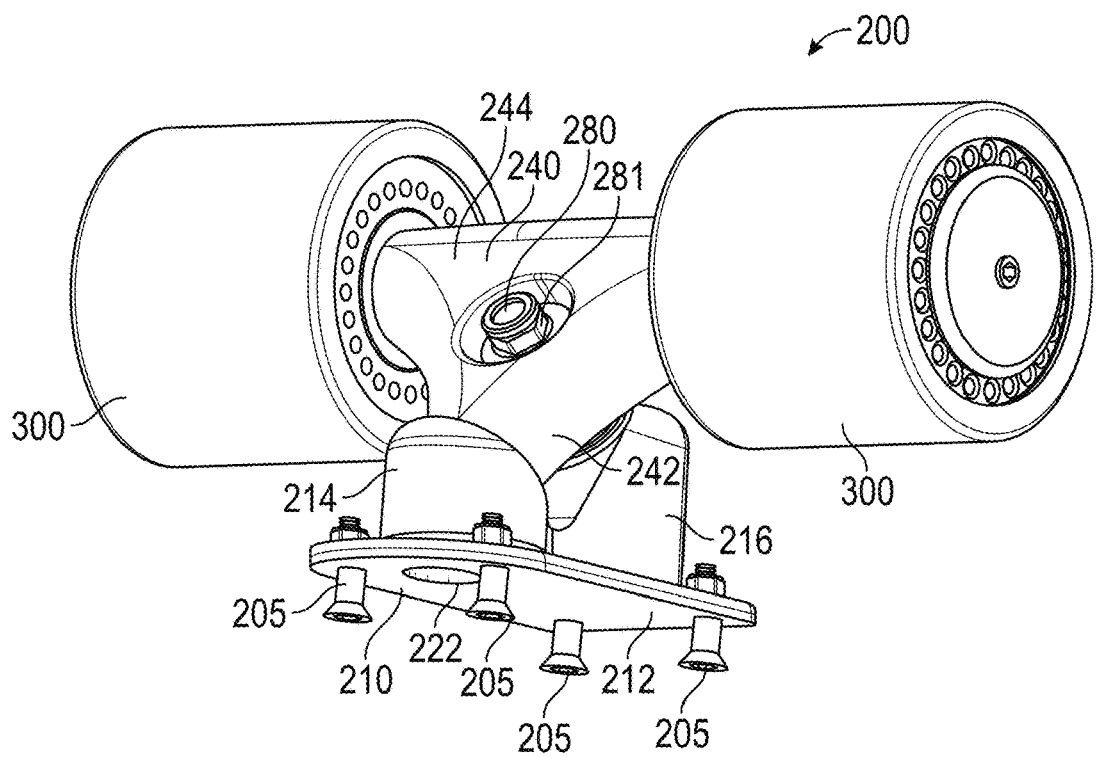
FIG. 3 is a perspective view of an embodiment of a motorized wheel assembly, including a truck, hanger, and two motorized wheels.

FIG. 3 is a perspective view of the motorized wheel assembly 200 of FIG. 1. As shown, the motorized wheel assembly 200 includes the truck 210, the hanger 240, and two motorized wheels 300. The truck 210 is configured to mount to the underside of the deck 110. In the illustrated embodiment, the truck 210 includes a baseplate 212 for mounting to the deck 110. In some embodiments, the baseplate 212 is a flange having a substantially flat surface for interfacing with the deck 110. The baseplate 212 includes holes through which the mounting hardware 205 (e.g., fasteners such as nut and bolt assemblies) is used to attach the hanger 240 to the deck. In FIG. 3, the mounting hardware 205 is illustrated positioned within the holes in the baseplate 212.

Figure 4:
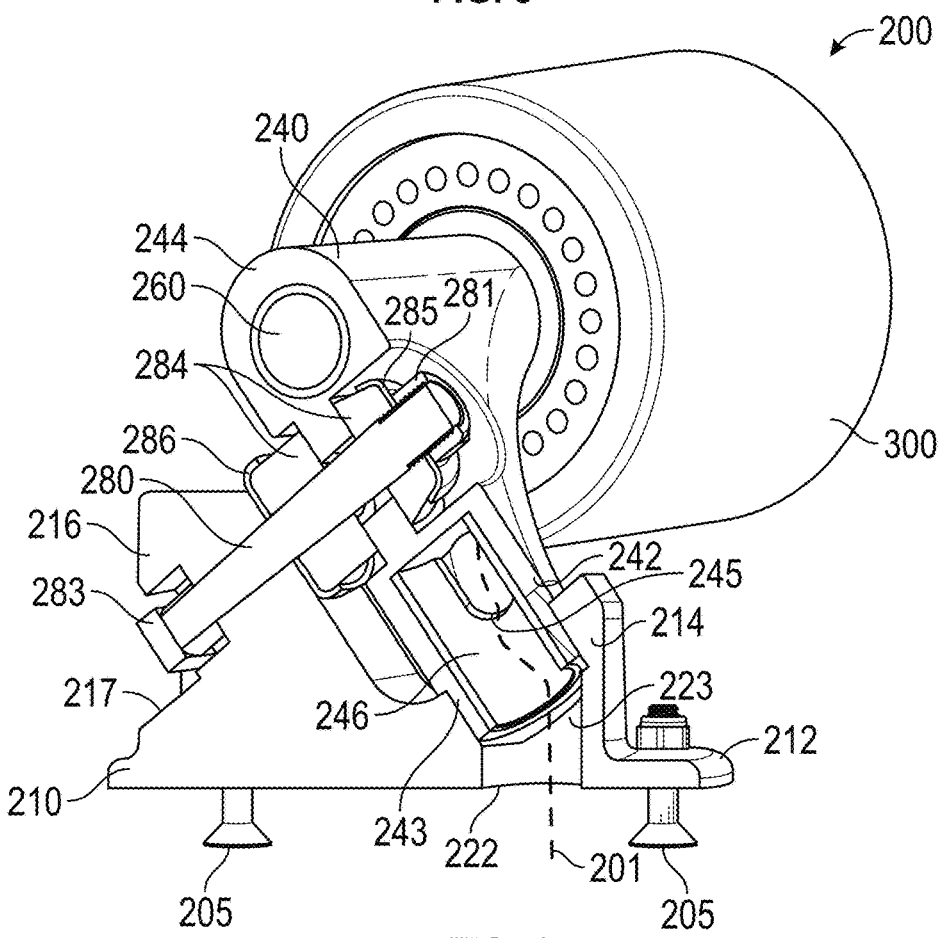
FIG. 4 is a longitudinal sectional view of the motorized wheel assembly of FIG. 3.

The main body of the truck 210 extends away from the baseplate 212 and includes a pivot portion 214 and a kingpin portion 216 for interfacing with the hanger 240. The pivot portion 214 is configured to receive a pivot portion 242 of the hanger 240. The pivot portion 214 provides a pivot point for the pivot portion 242 of the hanger 240 such that the hanger 240 can pivot laterally to allow for steering. The kingpin portion 216 of the truck 210 is configured to receive the kingpin 280, which extends through and connects the hanger 240 to the truck 210 (as shown in FIG. 4). The kingpin 280 may be configured to provide a resilient connection between then truck 210 and the hanger 240 to allow for steering. For example, the kingpin 280 may include bushings 284, as shown in FIG. 4.

As shown in the illustrated embodiment of FIG. 3, the truck 210 also includes an opening 222 that extends through the baseplate 212. As will be described in greater detail below, the opening 222 allows for the passage of wiring through the motorized wheel assembly 200 to the motorized wheels 300. The opening 222 may extend into the truck 210 from a side that, when mounted, contacts the deck 110. When mounted, the opening 222 may be aligned with a corresponding opening into the deck 110, thus allowing for passage of wiring between the deck 110 and the truck 210. In some embodiments, the opening 222 is positioned below the pivot portion 214 of the truck 210, such that the wiring can extend through the pivot portion 214 of the truck 210 and through the pivot portion 242 of the hanger 240 on route to the motorized wheels 300.

As noted previously, the hanger 240 is connected to the truck 210 by the kingpin 280. The kingpin 280 is secured by a kingpin nut 281 or other type of fastener. In the illustrated embodiment, the kingpin 280 extends through a central portion of the hanger 240. Below the kingpin 280, the pivot portion 242 of the hanger 240 pivotally engages the pivot portion 214 of the truck 210. Above the kingpin 280, the hanger 240 includes an axle portion 244. An axle 260 extends through the axle portion 244 of the hanger 240 (see FIGS. 4 and 5). In some embodiments, the axle 260 is pressed or glued into the axle portion 244 of the hanger 240. The motorized wheels 300 are mounted on the axle 260. The features of the motorized wheels 300 will be described below with reference to FIGS. 8A-11 and 14.

FIGS. 4 and 5 are cross-sectional views illustrating the internal features of the motorized wheel assembly 200 of FIG. 3. FIG. 4 is a longitudinal sectional view of the motorized wheel assembly 200. FIG. 5 is a transverse sectional view of the motorized wheel assembly 200 with the motorized wheels 300 removed for illustration purposes.

The truck 210 is shown in FIGS. 4 and 5 and includes the baseplate 212, the pivot portion 214, and the kingpin portion 216. The baseplate 212 includes openings for mounting hardware 205. The opening 222 is positioned on the baseplate 212 below the pivot portion 214. A channel 223 extends from the opening 222 through the pivot portion 214.

The kingpin 280 extends through the kingpin portion 216 of the truck 210. A kingpin recess 217 is formed in the kingpin portion 216. The kingpin recess 217 can extend partly into the kingpin portion 216 from a rear surface of the truck 210. The kingpin recess 217 can be configured to receive a kingpin head 283 of kingpin 280. In some embodiments, the kingpin recess 217 and the kingpin head 283 are configured in size and shape such that when the kingpin head 283 is received within the kingpin recess 217, the kingpin 280 is substantially prevented or substantially inhibited from rotating.

The hanger 240 is attached to the truck 210 by kingpin 280, which extends through central portion of hanger 240 as shown in FIG. 4. The kingpin 280 also extends through bushings 284 that are positioned on opposite sides of the hanger 240. The bushings 284 are maintained in place by washers 285, with one washer 285 positioned above the top bushing 284 and another washer 285 positioned below the bottom bushing 284. In some embodiments, the washers 285 are curved. The bushings 284 may be similar to those used in conventional skateboards. In some embodiments, the bushings 284 and the kingpin 280 resiliently connect the hanger 240 to the truck 210 to allow for steering.

The pivot portion 242 of the hanger 240 also allows for resilient connection between the hanger 240 and the truck 210 to allow for steering. For example, the pivot portion 242 includes a pivot bushing 243. The pivot bushing 243 provides a pivot point between the pivot portion 242 of the hanger 240 and the pivot portion 214 of the truck 210. The pivot bushing 243 is received partially within a portion of the channel 223 of the truck 210. A pivot tube 246 extends through the pivot portion 242 and the pivot bushing 243. The pivot tube 246 is hollow. In some embodiments, the pivot tube 246 is rigid. In some embodiments, the pivot tube 246 is flexible. Openings 245 through the walls of the pivot tube 246 are connected to channels 247 (see FIG. 5) that extend through the hanger 240. In the illustrated embodiment, a first channel 247 extends through the hanger 240 on a first side of the kingpin 280, and a second channel 247 extends through the hanger 240 on a second side of the kingpin 280. In some embodiments, only a single channel 247 is included. The channels 247 extend through the hanger 240 between the pivot portion 242 and the axle portion 244.

The axle 260 is received in the axle portion 244 of the hanger 240. In some embodiments, the axle 260 may be pressed or glued into the axle portion 244. In the illustrated embodiment, the axle 260 is hollow and includes a channel 268 formed therein. The axle 260 and the channel 268 can extend along a central axis or longitudinal axis 269. A longitudinal axis can be an axis that extends along a greatest or longest dimension of a component. Axle openings 261 in the wall of the axle 260 are aligned with the hanger channels 247. In the illustrated embodiment, two axle openings 261 are included that align with the two hanger channels 247. In some embodiments, only a single channel 247 and a single axle opening 261 are included. In some embodiments, more than two channels 247 and axle openings 261 are included.

As shown, sockets 290 are positioned within the hollow channel 268 of the axle 260. In some embodiments, the sockets 290 are pressed or glued into the axle 260. In some embodiments, mechanical fasteners (e.g., bolts, screws, etc.)

are used to fix the sockets 290 within the axle 260. In some embodiments, the sockets 290 can be connected to the axle 260 any suitable or known process or processes, including permanent adhesive, thermal bonds, ultrasonic bonds, spot welds, i.e., thermal weld points, a stitch or stitches, strip welds, tacks formed by crimping, and/or press fit, shrink fit, sliding fit, interference fit, and/or snap fit mechanisms, including male and female parts (e.g., tongue-and-groove corresponding parts), and the like, including any combination thereof. As will be described below, the sockets 290 are configured to mate with plugs on the motorized wheels 300 to establish an electrical (and/or other type of) connection therebetween. The sockets 290 can be configured to allow for quick release of the motorized wheels 300. The ends of the axle 260 can also include features for engaging the motorized wheels 300. For example, in the illustrated embodiment, the ends of the axle 260 include openings 263 and slots 267. The openings 263 and slots 267 can be configured to engage with corresponding features on the motorized wheels 300 to secure the motorized wheels 300 to the axle 260. In some embodiments, the openings 263 and slots 267 engage with a quick release mechanism 390 that secures the motorized wheels 300 to the axle 260. As will be discussed below, in some embodiments, the openings 263 engage with retaining balls, protrusions, projections, or bosses 334. The slots 267 can engage with shoulders 336 of a quick release mechanism 390 of the motorized wheel 300 (see FIGS. 8B-9B).

As illustrated by the dashed lines in FIGS. 4 and 5, ducts 201 are formed through the motorized wheel assembly 200 between the opening 222 and the sockets 290. The ducts 201 can be continuous. In the illustrated embodiment, the ducts 201 are formed by the opening 222, channel 223, pivot tube 246, openings 245, channels 247, axle openings 261, and axle 260. The ducts 201 provide a continuous passageway through the motorized wheel assembly 200 through which services such as wiring, cooling air, hydraulic fluid, liquid coolant, etc., can be routed from the deck 110, through motorized wheel assembly 200, to the socket 290 for connection to the motorized wheel 300.

Figure 6A:
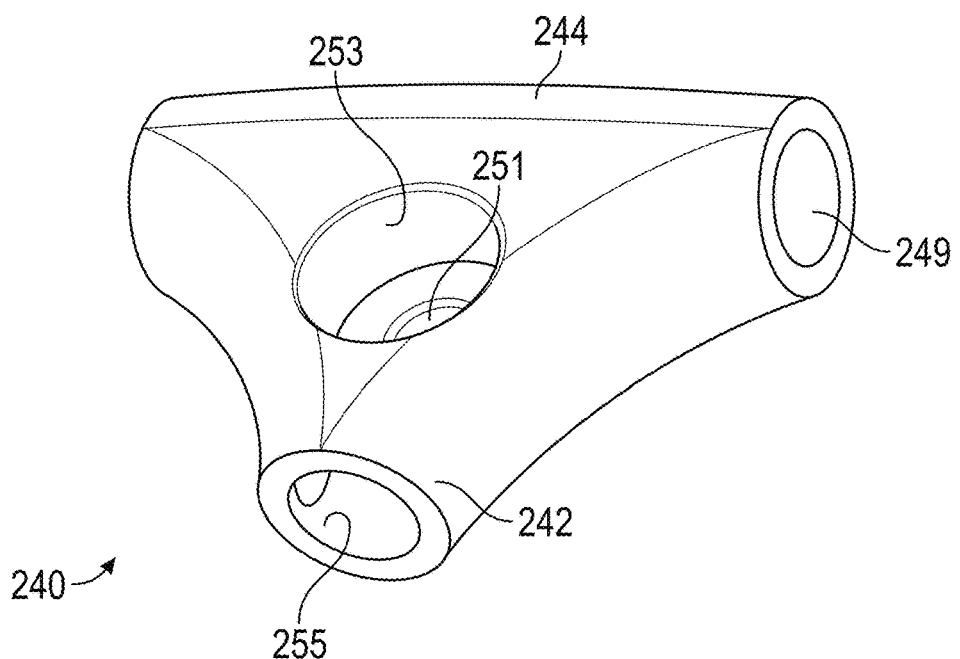
FIG. 6A is a perspective view of an embodiment of the hanger of the motorized wheel assembly of FIG. 3.
Figure 6B:
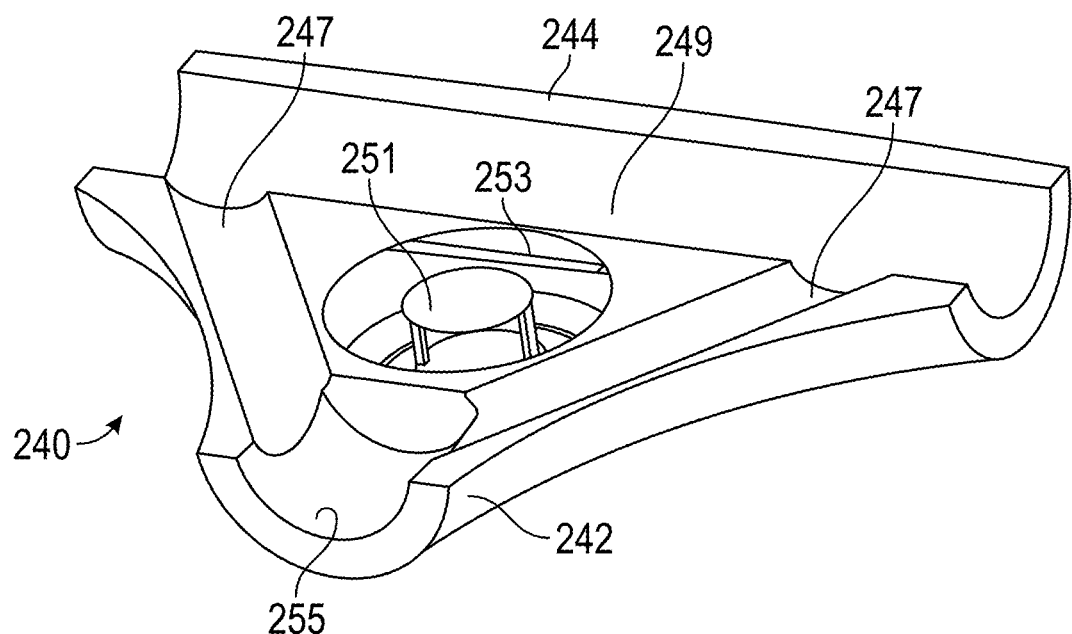
FIG. 6B is a transverse sectional perspective view of the hanger of FIG. 6A.

FIGS. 6A and 6B illustrate an embodiment of the hanger 240. FIG. 6A is a perspective view, and FIG. 6B is a transverse sectional perspective view. As shown in FIG. 6A, the body of the hanger 240 includes the axle portion 244 and the pivot portion 242. The body of the hanger 240 also includes an opening 251 extending through a central portion thereof for receiving the kingpin 280. A recess 253 is formed in each of the top and bottom surfaces of the central portion of the body of the hanger 240 for receiving the bushings 284 and washers 285.

Figure 12:
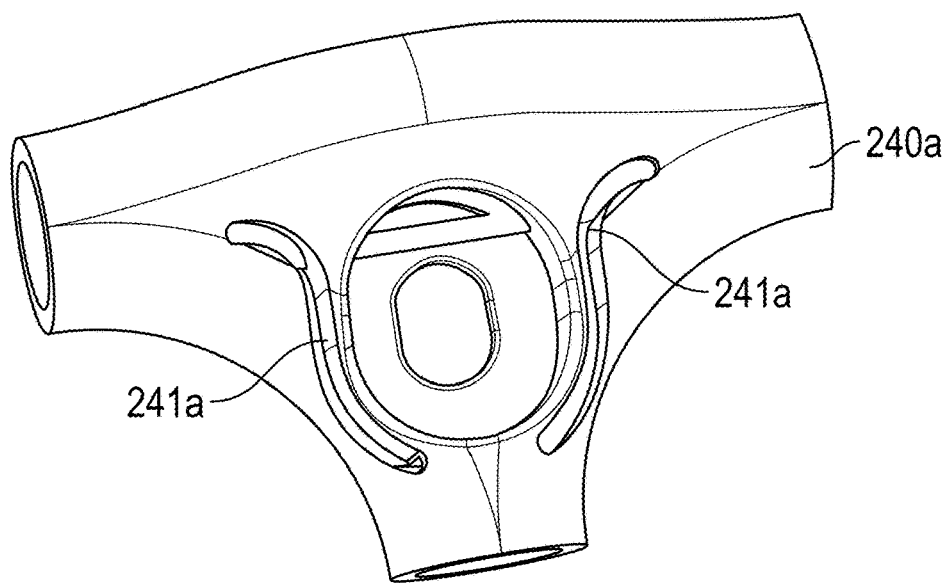
FIG. 12 is a perspective view of an embodiment of a hanger that includes open channels.
Figure 13:
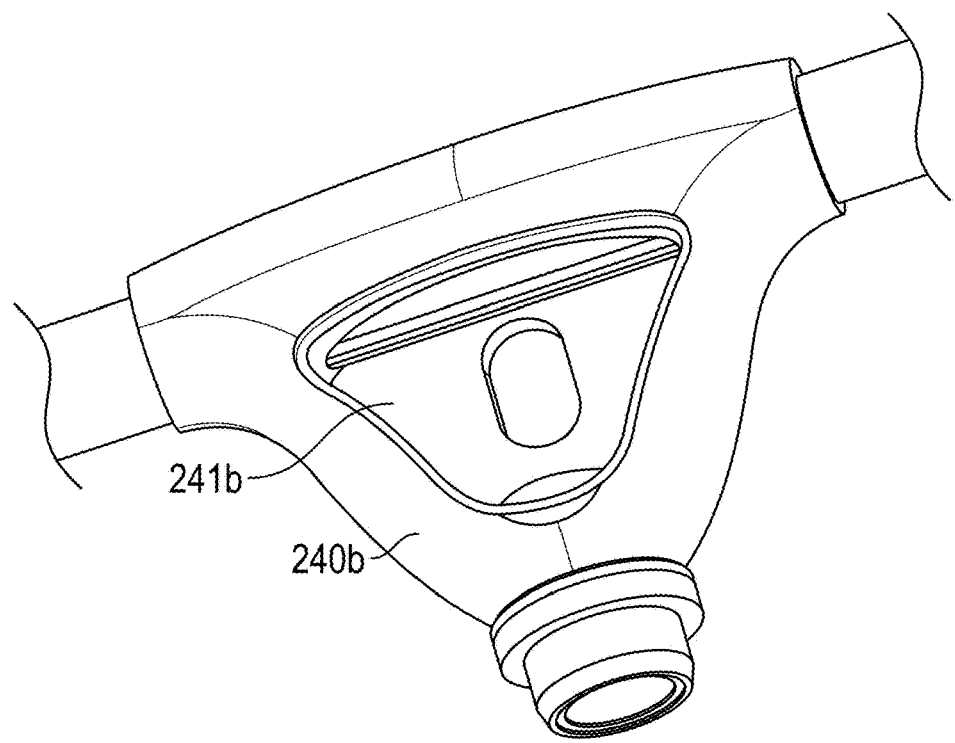
FIG. 13 is a perspective view of an embodiment of a hanger that includes an open plenum.

In the illustrated embodiment of FIGS. 6A and 6B, a channel 249 extends through the axle portion 244. The channel 249 is configured in size and shape to receive the axle 260. A recess 255 is formed in the pivot portion 242 of the hanger 240. The recess 255 is configured in size and shape to receive the pivot tube 246. The recess 255 is connected to the channels 247. The channels 247 are also connected to the channel 249. The hanger 240 shown in FIGS. 6A and 6B is provided by way of example only, and other embodiments of hangers are possible, for example, as shown in FIGS. 12 and 13 described below.

Figure 7A:
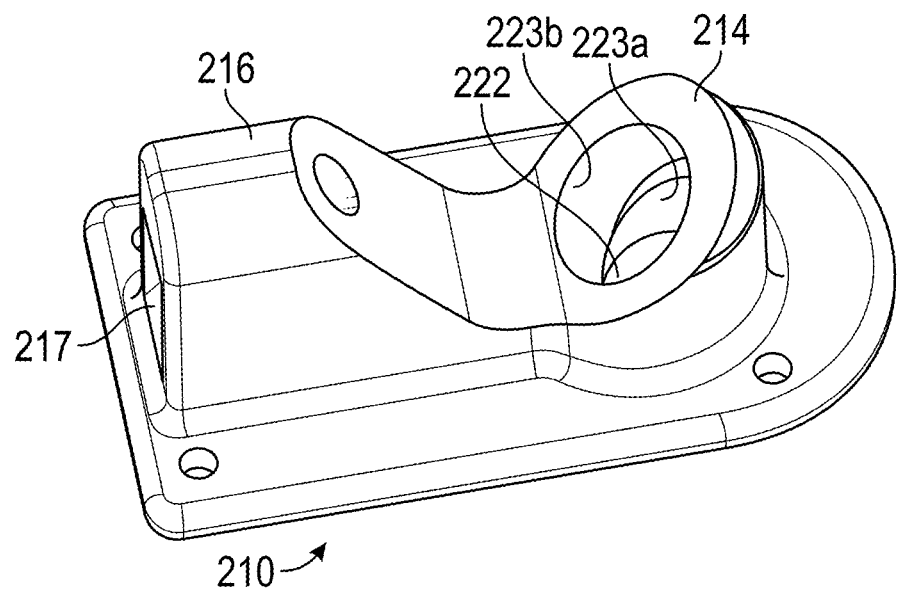
FIG. 7A is a perspective view of an embodiment of the truck of the motorized wheel assembly of FIG. 3.
Figure 7B:
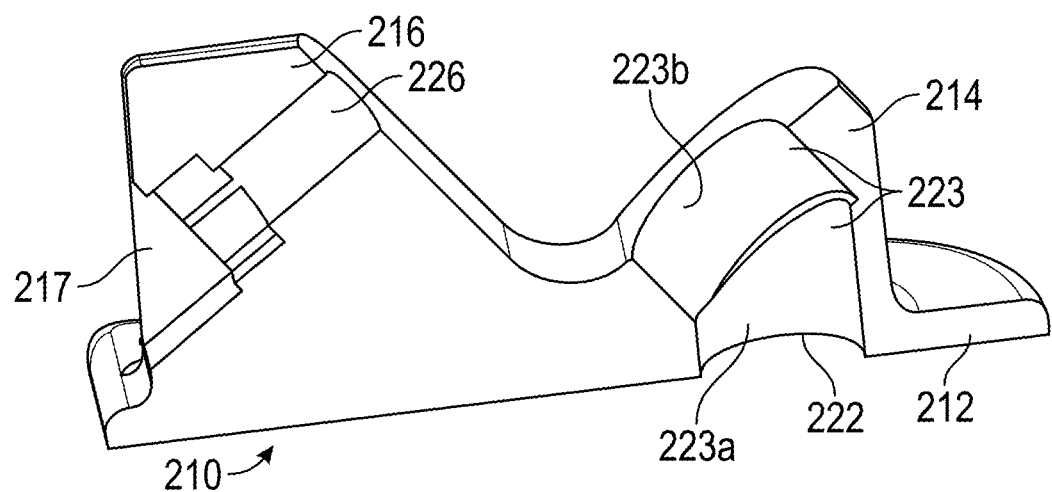
FIG. 7B is a longitudinal sectional perspective view of the truck of FIG. 7A.

FIGS. 7A and 7B illustrate an embodiment of the truck 210. FIG. 7A is a perspective view, and FIG. 7B is a longitudinal sectional perspective view. The truck 210 includes a baseplate 212 for mounting the truck 210 to the deck 110. In FIG. 7A, mounting holes are shown, which extend through the baseplate 212 and are configured to receive mounting hardware 205. A kingpin portion 216 and a pivot portion 214 extend away from the baseplate 212. A channel 226 extends through the kingpin portion 216. The channel 226 is configured to allow the kingpin 280 to extend therethrough. A kingpin recess 217 is formed in the rear of surface of the kingpin portion 216. The kingpin recess 217 is configured to receive the head 283 of the kingpin 280 as described above.

A channel 223 extends through the pivot portion 214 of the truck 210 from the opening 222. In the illustrated embodiment, the channel 223 includes a first portion 223a and a second portion 223b. The first portion 223a may extend along an axis substantially orthogonal to the plane of the baseplate 212. The second portion 223b may be configured to receive at least a portion of the pivot bushing 243 therein. The second portion 223b extends along an axis that is angled with respect to the axis of the first portion 223a. In some embodiments, the angle between the axes is between about 15 degrees and about 75 degrees, about 30 degrees and about 60 degrees, between about 40 degrees and about 50 degrees, or about 45 degrees, although other angles are possible. In some embodiments, the axis of the second portion 223b is oriented at about 90 degrees from an axis of the channel 226 and the kingpin 280. The illustrated embodiment of FIGS. 7A and 7B is provided by way of example only, and other embodiments of trucks are possible.

Figure 8A:
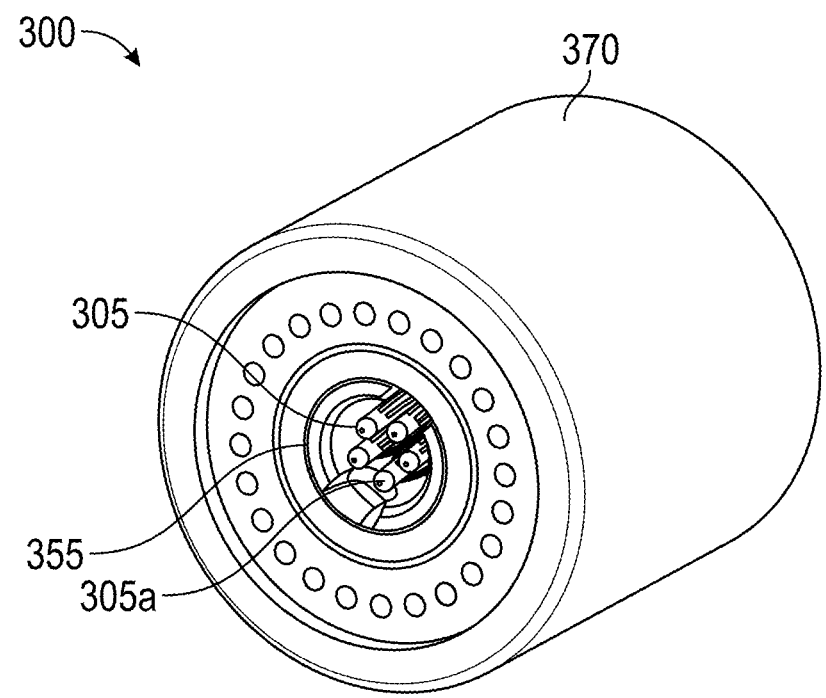
FIG. 8A is a perspective view of an embodiment of a motorized wheel of the motorized wheel assembly of FIG. 3.

An embodiment of a motorized wheel 300 will now described with reference to FIGS. 8A-11. FIG. 8A is an inside perspective view of the motorized wheel 300, shown removed from the axle 260. As shown, the motorized wheel 300 includes a plug 305. The plug 305 is configured and positioned to mate with the socket 290 (see FIG. 5) when the motorized wheel 300 is installed on the axle 260. In the illustrated embodiment, the plug 305 includes five pins, although other numbers of pins and other types of plugs 305 are possible. In some embodiments, the plug 305 and socket 290 establish an electrical connection. In some embodiments, the plug 305 and socket 290 may additionally or alternatively establish fluid connections, for example, for a cooling fluid or hydraulic fluid, or other types of connections.

Figure 8B:
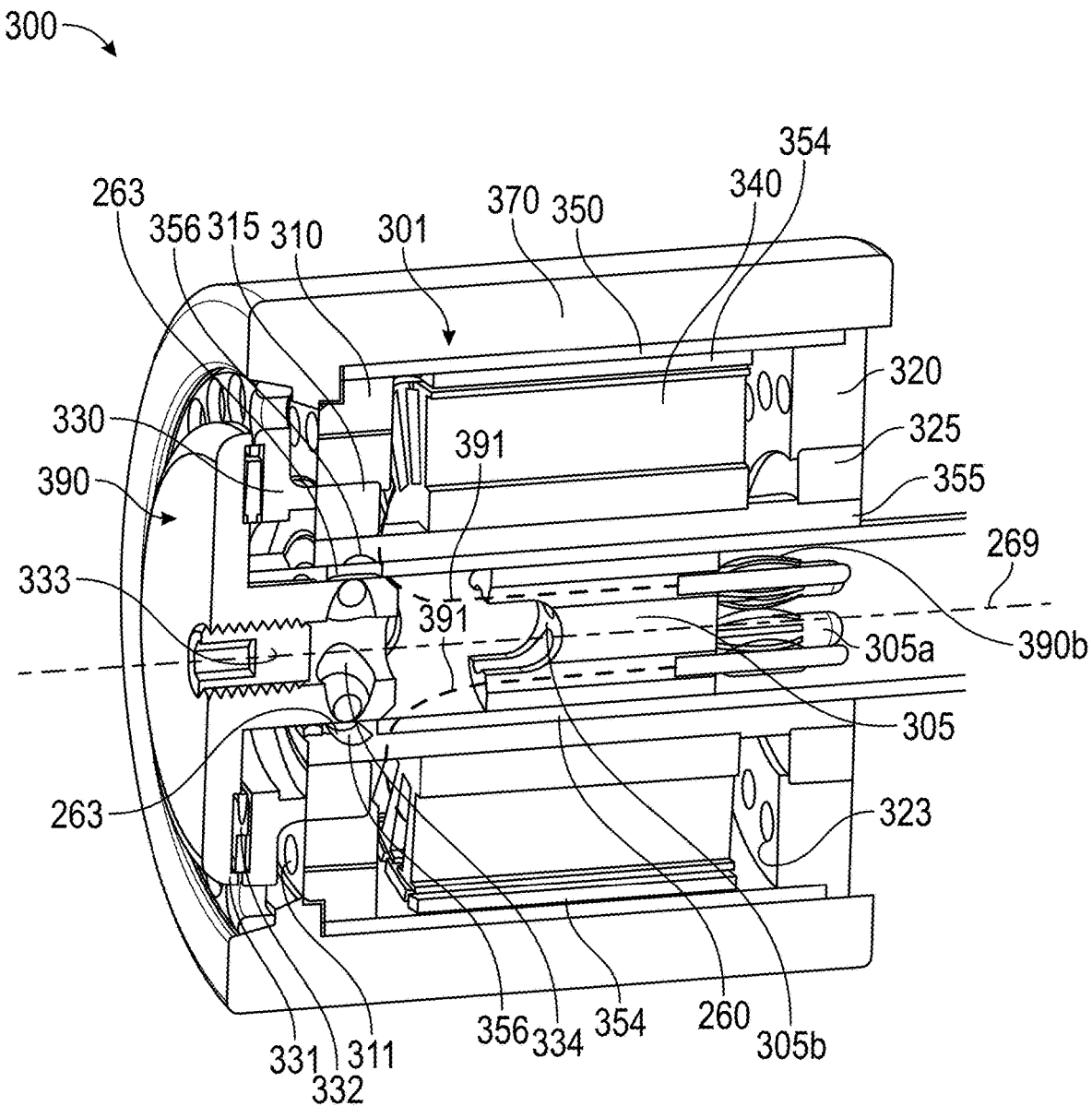
FIG. 8B is a cross-sectional perspective view of the motorized wheel of FIG. 8B.

FIG. 8B is a cross-sectional perspective view of the motorized wheel 300. The motorized wheel includes a tire 370 mounted on an electric motor 301. The tire 370 and the electric motor 301 are shown separately in the exploded view of FIG. 10. The electric motor 301 serves as the hub for the tire 370 and can drive it directly as described below and as described in PCT Application No. PCT/IB2016/000536, which is incorporated herein by reference in its entirety for all purposes and made a part of this specification.

In some embodiments, the electric motor 301 is an outrunner motor. Outrunner motors are those that have an internal stator that is surrounded by an external rotor. The external rotor spins relative to the internal stator (e.g., about the central axis 269), which generally remains in a rotationally fixed orientation. In some embodiments, the electric motor may be brushless. In the illustrated embodiment, the electric motor 301 comprises an outer casing that is formed by an outer bell end 310, an outer surface of a rotor 350, and an inner bell end 320. The outer casing surrounds a stator 340. The stator 340 is mounted on a boss 355. The boss 355 is configured to mount on an axle 260 (see for example, FIG. 5). The boss 355 is further connected to the outer bell end 310 via a bearing 315. Similarly, the boss 355 is further connected to the inner bell end 320 via a bearing 325. The bearings 315, 325 allow the outer casing of the electric motor (in other words, the outer bell end 310, the rotor 350, and the inner bell end 320) to rotate relative to the boss 355 and the stator 340. When the boss 355 is attached to the axle 260 of the motorized skateboard 100, the electric motor 301 can drive the tire 370, thus allowing the motorized wheel 300 to propel the motorized skateboard 100. For example, the boss 355 and stator 340 can be substantially fixedly attached to the axle 260. When the motorized wheel 300 is powered, the rotor 350 spins relative to the stator 340. This rotation may be imparted to the tire 370.

In the illustrated embodiment, the outer bell end 310 also includes cooling holes 311 (openings, cutouts, slots, apertures, etc.). The cooling holes 311 can allow cooling fluid (for example, air or water) to flow into and out of the interior of the electric motor 301. On the opposite end of the electric motor 301 the inner bell end 320 can also include features similar to the outer bell end 310, such as cooling holes 323.

Each of the bearings 315, 325 may be ring bearings, including a central opening formed there through. The boss 355 is received within the central openings of the bearings 315, 325. The bearings 315, 325 allow the outer bell end 310, the rotor 350, and the inner bell end 320 to rotate together relative to the boss 355. The boss 355 may be configured as a substantially cylindrical tube. One or more of the ends of the boss 355 may be open. The boss 355 may be configured to receive or otherwise attach to an axle 260 of the motorized skateboard 100 to which the motorized wheel 300 is to be attached. In some embodiments, the boss 355 is rotationally fixed to the stator 340 such that the two rotate together.

The stator 340 can comprise a lamination stack with copper windings (in the figures, the copper windings are not shown for ease of illustration, although the windings or other suitable mechanisms can be included in use). The rotor 350 includes one or more magnets 354 mounted on an inner surface thereof. A wide variety of configurations for the stator 340 and the rotor 350 are possible, including various numbers of poles and magnets. The rotor 350 may comprise a mild steel cylinder fitted with neodymium boron permanent magnets on its inner surface. The stator 340 can be formed from laminated sheet steel, wound with copper wire. Other configurations and materials for the rotor 350 and/or the stator 340 are possible. A control board for the electric motor 301 may be included and may be housed within the outer casing of the electric motor or may be remotely located, for example, on or within the deck 110 of the motorized skateboard 100 (for example, among the components 150).

The motorized wheel 300 may be considered a direct drive system because power is transferred substantially directly from the electric motor 301 to the tire 370. Other mechanical structures or linkages, including gears and/or belts are not necessary. Utilizing a motorized wheel 300 as discussed herein and also discussed in PCT Application No. PCT/IB2016/000536. which is incorporated by reference, can substantially mitigate or negate the need for a transmission (for example, a transmission including a gear box). This may provide several advantages. For example, without a gearbox with chain or belt means, maintenance of the vehicle can be substantially minimized or mitigated because, for example, there are minimal wearing parts other than the two inner and outer bearings 315, 325 per motorized wheel 300 (and the tire 370). Accordingly, where the motorized wheel 300 is included on the motorized skateboard 100, the maintenance of the motorized skateboard 100 may be substantially the same as the maintenance on an unpowered board. Further, the bearings 315, 325 on the motorized wheel 300 may be larger than those of an unpowered board, so that the bearing maintenance is also significantly reduced.

Additionally, a motorized wheel 300 as discussed herein (without a transmission) can provide lower rolling drag or coasting losses in use. In vehicle designs that include a belt or gearbox transmission, by comparison, the transmission element typically loses energy, as well as all the bearings necessary to carry the various shafts. For example, in a typical belt driven skateboard, each motor will have one or two additional bearings to support the belt tension, so each driven wheel may have five, six, or more bearings in the power train. The losses in such a dual motor belt driven board may be about significantly higher than a board including the motorized wheel 300. These losses make a notable difference in the ease with which the board can be pushed when the motor is not powered, for example, when the battery is dead (depleted of power).

Further, because the motorized wheel 300 does not have any belts or has minimal belts and transmission mechanisms, there is no belt tensioning required (or minimal/infrequent belt tensioning or transmission mechanism maintenance for any such mechanisms that may be present), and unskilled users can operate the board substantially without having to consider routine maintenance on the power transmission. No belt, chain, or gear transmission system means that there are no transmission losses while motoring, which can improve the battery range. Further, because the motorized wheel 300 does not have any belts it can be much simpler to remove and replace the motorized wheel 300.

As illustrated in FIG. 8B, the motorized wheel 300 can include a quick release mechanism 390. In some embodiments, the quick release mechanism 390 allows for relatively simple mounting of the motorized wheel 300 on the axle 260. For example, the quick release mechanism 390 can include a locking plate 331, a fastener 333, a thrust bearing 332, and a retainer 330. Embodiments of some of the components of the quick release mechanism 390 are shown in the exploded views of FIGS. 9A and 9B, as described below. To mount the motorized wheel 300 on the axle 260, the boss 355 can be slid onto the axle 260. The quick release mechanism 390 can then be used to retain the motorized wheel 300 on the axle 260 by tightening the fastener 333.

In some embodiments, the fastener 333 can be a grub screw, a thumbscrew, a bolt, or any other suitable fastener. In some embodiments, the fastener 333 is configured to be tightened by hand. In some embodiments, the fastener 333 is configured to be tightened with common tools (such as Allen wrenches or screwdrivers). In some embodiments, the fastener 333 is tightened with a single turn, half turn, or quarter turn of the fastener 333. Advancing the fastener 333 can force retaining balls 334 in the locking plate 331 to move outwardly and engage with openings 263 (see FIG. 5) in axle 260. The boss 355 can include divots 356 formed on an inner surface the boss 355 that are configured in size and shape to radially align with the openings 263 of the axle 260 and the retaining balls 334. When the fastener 333 is advanced, the retaining balls 334 can be forced outward, such that a portion of the retaining balls 334 extends through the openings 263 of the axle 260 and into the divots 356 of the boss 355.

When the retaining balls 334 engage the openings 263 in the axle 260 and/or the divots 356 of the boss 355, the locking plate 331 is held in a fixed relationship with the axle 260. That is, the retaining balls 334 prevent the locking plate 331 from being removed from the axle 260, until the fastener 333 is loosened such that the retaining balls 334 can recede into the locking plate 331. In some embodiments, the retaining balls 334 further prevent the locking plate 331 from rotating relative to the axle 260. When the locking plate 331 is thus secured to the axle 260, the locking plate 331 is held against the thrust bearing 332. The thrust bearing 332 then presses the retainer 330 against the tire 370 to hold the motorized wheel 300 in place on the axle 260. The thrust bearing 332 allows the tire 370 and outer bell end 310 of the electric motor 301 to rotate relative to the locking plate 331.

Thus, in some embodiments, tightening the single fastener 333 can secure the motorized wheel 300 to the axle 260, and loosening the single fastener 333 can allow for quick release of the motorized wheel 300. For example, the fastener 333 can be loosened such that retaining balls 334 withdraw from openings 263 of the axle 360. The motorized wheel 300 can then slide off the axle 260. Further, the tire 370 can also slide off the electric motor 301. Thus, the tire 370, the electric motor 301, or the entire motorized wheel 300 can be easily replaced. In some embodiments, the fastener 333 cannot be fully seated unless the retaining balls 334 have been extended into the openings 263 in the axle 260. In some embodiments, retaining balls 334 can be replaced by equivalent mechanisms, such as dogs or pawls of varying shapes.

Figure 9A:
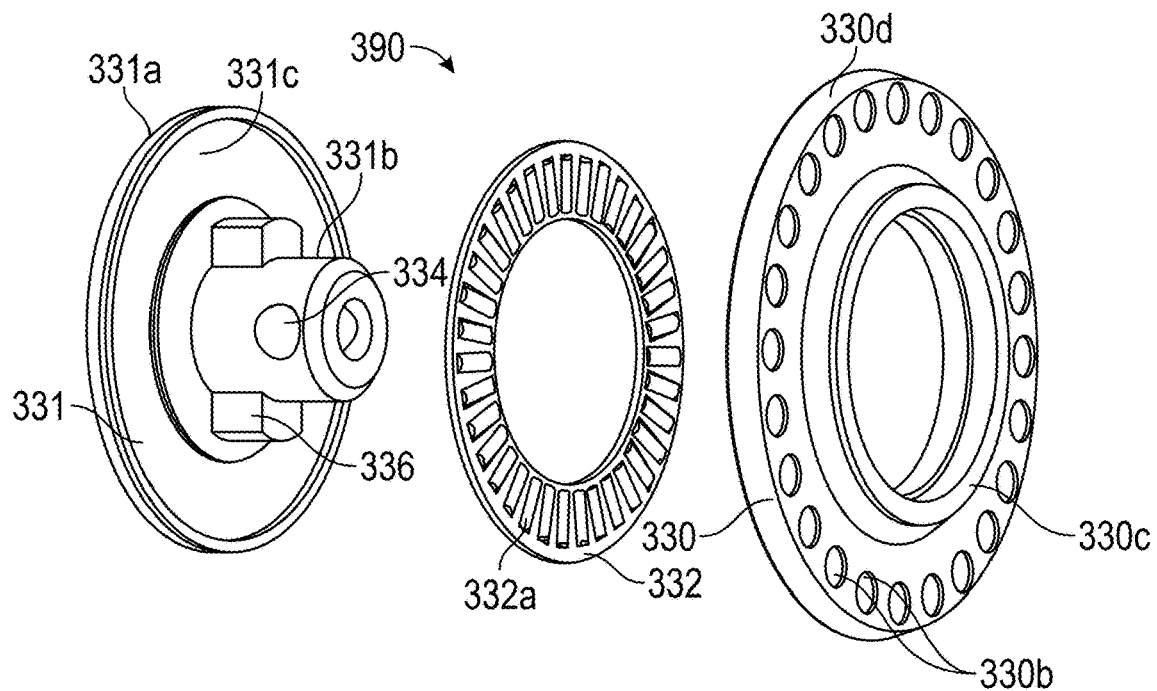
FIG. 9A is an exploded inside perspective view of an embodiment of a quick connect mechanism.
Figure 9B:
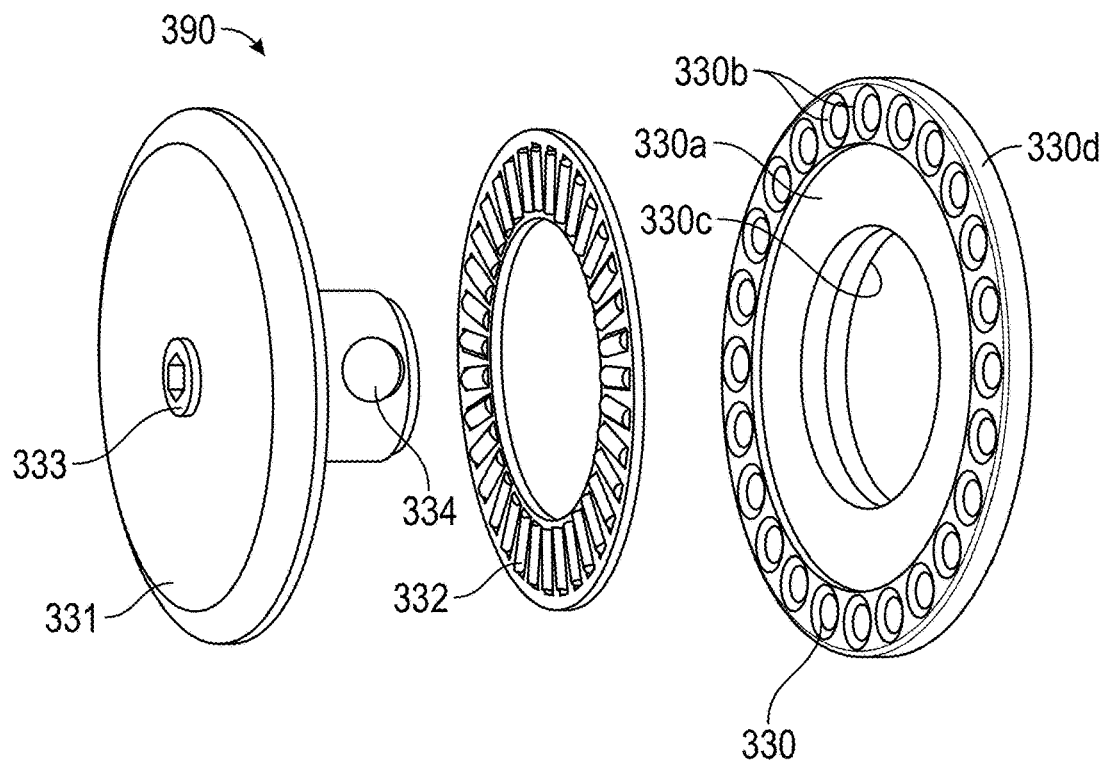
FIG. 9B is an exploded outside perspective view of the quick connect mechanism of FIG. 9A.

FIGS. 9A and 9B show inside and outside exploded perspective views of an embodiment of some of the components of a quick release mechanism 390 that can be used to secure the motorized wheel 300 to the axle 260 as described above. Embodiments of the locking plate 331, the thrust bearing 332, and the retainer 330 are shown. In the illustrated embodiment, the locking plate 331 comprises a circular disc 331a having a cylindrical projection 331b extending from and centered on an inner surface of the circular disc 331a. The cylindrical projection 331b includes the retaining balls 334. The retaining balls 334 can be loosely retained within the cylindrical projection 331b such that they can move backwards and forwards in a direction substantially orthogonal to a central axis of the cylindrical projection 331b. The outward motion of the retaining balls 334 may be limited such that the in their outermost position a portion of the retaining balls 334 extends beyond the outer surface of the cylindrical projection 331b. The cylindrical projection 331b is configured in size and shape to be at least partially received within channel 268 the axle 260. As shown in FIG. 9B, the fastener 333 extends into the outer surface of the circular disc 331a and into the cylindrical projection 331b. As the fastener 333 is advanced into the cylindrical projection 331b, it forces retaining balls 334 outwardly. In some embodiments, the cylindrical projection 331b includes shoulders 336 configured to substantially prevent or substantially inhibit the locking plate 331 from rotating as the fastener 333 is rotated. In some embodiments, the shoulders 336 engage with (for example, are received, or at least partially received, within) slots 267 in the ends of the axle 260. When the shoulders 336 engage the slots 267, the locking plate 331 is prevented (or substantially prevented) from rotating relative to the axle 260.

In the illustrated embodiment, a trough 331c (e.g., groove, indentation, depression, etc.) is formed on the inner surface of the circular disc 331a of the locking plate 331 and configured to receive the thrust bearing 332. In the illustrated embodiment, the thrust bearing 332 is a flat ring shape including bearings 332a. In some embodiments, the bearings 332a are roller bearings, although other types of bearings are also possible. An outer surface of the retainer 330 also includes a trough 330a (e.g., groove, indentation, depression, etc.) that is configured to receive the thrust bearing 332. When assembled, the thrust bearing 332 is positioned in the troughs 331c, 330a between the locking plate 331 and the retainer 330. The thrust bearing 332 allows the retainer 330 to rotate relative to the locking plate 331 by, for example, bearings 332a rotating/spinning relative to or against the surfaces of the troughs 331c, 330a. Accordingly, as bearings 332a rotate/spin relative to the troughs 331c, 330a, the thrust bearing 332 may also rotate/spin about the central axis 269. Thus, the retainer 330 is free to rotate with the tire 370 and outer casing (outer bell end 310, rotor 350, and inner bell end 320) of the electric motor 301, while the locking plate 331, axle 260, the boss 355, and stator 340 of the electric motor 301 remain fixed (do not rotate).

The retainer 330 can be configured to have ring shape. In some embodiments, holes 330b extend through the retainer 330. The holes 330b can be configured to allow for cooling of the motorized wheel 300, as described, for example, in PCT Application No. PCT/IB2016/000536, which is incorporated herein by reference in its entirety for all purposes and made a part of this specification. In the illustrated embodiment, a cylindrical flange 330c extends from the inner surface of the retainer 330. When assembled, in some embodiments, the cylindrical flange 330c contacts the outer bearing 315 of the motorized wheel, in order to, for example, retain the outer bearing 315 in position between the retainer 330 and the outer bell end 310 or stator 340. The retainer 330 also includes an outer lip 330d. When assembled, in some embodiments, the outer lip 330d contacts a corresponding groove 376 (see FIGS. 10 and 11) formed in the tire 370, and thus holds the tire 370 in place on the electric motor 301.

Returning to FIGS. 8A and 8B, the plug 305 is positioned within the boss 355. In some embodiments, the plug 305 is pressed or glued within the boss 355. In some embodiments, mechanical fasteners (e.g., screws, bolts, etc.) can be used to retain the plug 305 within the boss 355. In some embodiments, the plug 305 can be connected to the boss 355 by any suitable or known process or processes, including permanent adhesive, thermal bonds, ultrasonic bonds, spot welds, i.e., thermal weld points, a stitch or stitches, strip welds, tacks formed by crimping, and/or press fit, shrink fit, sliding fit, interference fit, and/or snap fit mechanisms, including male and female parts (e.g., tongue-and-groove corresponding parts), and the like, including any combination thereof. In some embodiments, the plug 305 includes cutouts 305b that are used to position the plug 305 within the boss 355. In some embodiments, the cutouts 305b engage features on the locking plate 331, or other parts of the motorized wheel 300. As shown in FIG. 5, the corresponding socket 290 is positioned within the axle 260. Thus, when the motorized wheel 300 is placed onto the axle 260, the plug 305 can automatically engage the socket 290. In the illustrated embodiment, the plug 305 includes prongs 305a. Five prongs 305a are illustrated (see FIG. 8A). In some embodiments, plug 305 can have one, two, three, four, six, seven, eight, nine or more prongs 305a.

When engaged with the socket 290, each prong 305a is received within a corresponding receptacle 290a (see FIG. 5) of the socket 290. The prongs 305a can be configured with a spring portion 390b (see FIG. 8B) that is configured to circumferentially expand to contact the walls of the receptacle 290a. When the motorized wheel 300 is placed onto the axle 260, the prongs 305a of the plug 305 are received within the receptacles 290a of the sockets 290. The receptacles 290a slightly compress the spring portion 390b of the prongs 305a, and the spring force of the spring portion 390b presses against the interior walls of the receptacles 290a to help ensure and maintain an electrical connection. Accordingly, manual and separate connection of the plug 305 and socket 290 may not be needed. This mitigates the need for unskilled users to handle electrical connections and reduce the total number of steps required to remove or replace the motorized wheel 300. In some embodiments, the plug 305 and the socket 290 can be reversed, with the socket 290 positioned in the motorized wheel 300 and the plug 305 positioned in the axle 260. Wiring 391 (illustrated by dashed lines) or other connection can be run between the plug 305 and the interior of the electric motor 301. For example, as shown in FIG. 8B, wiring 391 connects the prongs 305a of the plug 305 to the windings on the stator 340.

Other types of plugs 305 and sockets 290 can also be used. In some embodiments, the plug 305 and socket 290 establish connections for other services (e.g., fluid connections for cooling fluids, lubricants, hydraulics, etc.) between the motorized wheel 300 and the axle 260. Thus, is some embodiments, the plug 305 and socket 290 are configured to establish fluid connections between the axle 260 and the motorized wheel 300.

In some embodiments, the motorized wheel 300 also includes a cooling system, for example, as described in Patent Cooperation Treaty (PCT) Application No. PCT/IB2016/000536, filed Apr. 9, 2015, which is incorporated herein by reference. Inclusion of a cooling system can increase the power to weight ratio and reduce the weight of the motorized wheel 300. Because the electric motor is a substantial portion of the weight of a vehicle, reducing the weight of the motorized wheel may have a large impact on reducing the overall weight of the vehicle.

Figure 10:
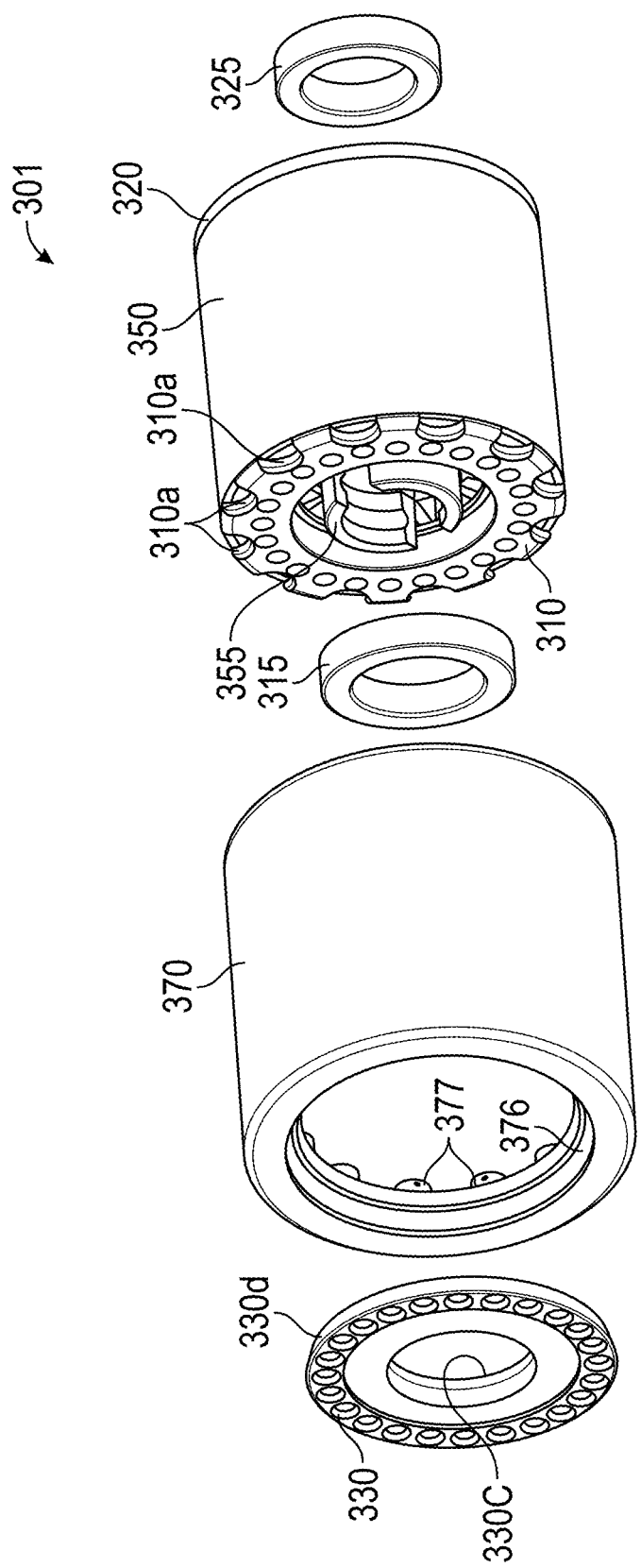
FIG. 10 is an exploded perspective view of an embodiment of a motorized wheel.

FIG. 10 is an exploded perspective view of some of the components of the motorized wheel 300. FIG. 10 illustrates the retainer 330, the tire 370, the outer bearing 315, the electric motor (including the outer bell end 310, the stator 340, and the inner bell end 320), and the inner bearing 325. In the assembled state, the outer lip 330d of the retainer 330 presses into the groove 376 of the tire 370 holding it onto the electric motor. Dogs 377 (or similar features, such as pawls, bosses, protrusions, etc.) on the tire 370 engage with corresponding cutouts 310a (or other similar features) on the outer bell end 310. This ensures that rotation of the electric motor drives the tire 370. The cylindrical flange 330c of the retainer holds the outer bearing 315 in place. The inner bell end 320 also holds the inner bearing 325 in place against the end of the hanger 240. Thus, in some embodiments, when the motorized wheel 300 is removed, the inner and outer bearings 315, 325 are also easily replaceable.

Figure 11:
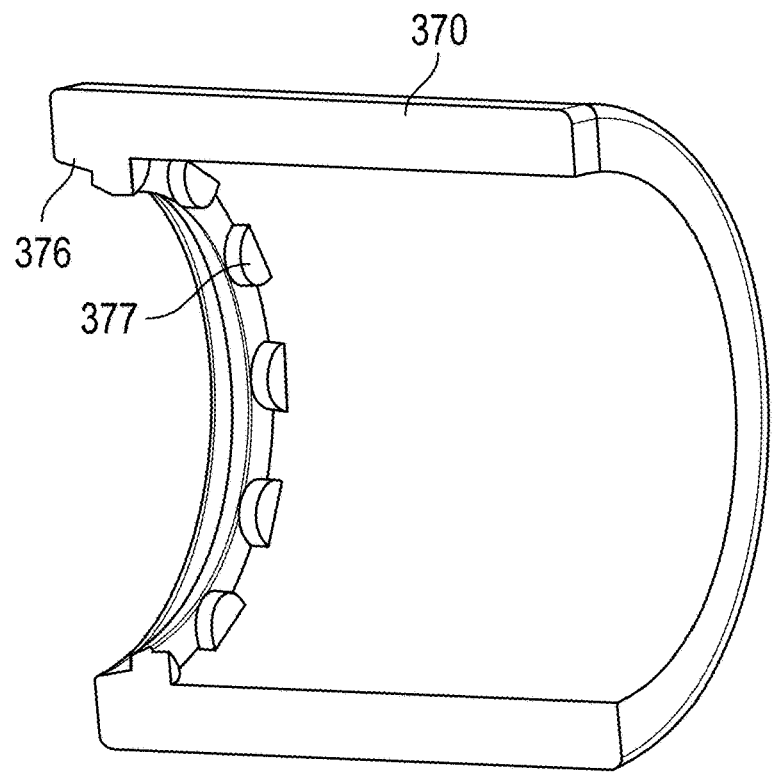
FIG. 11 is a sectional perspective view of an exemplary embodiment of a tire for the motorized wheel of FIG. 10.

FIG. 11 is a sectional perspective view of an exemplary embodiment of a tire 370 for the motorized wheel of FIG. 10. The groove 376 and dogs 377 are shown.

FIGS. 12 and 13 show perspective views of additional embodiments of hangers 240a, 240b. FIG. 12 illustrates a hanger 240a that includes open channels 241a in place of (or in addition to) the internal channels 247 shown in FIG. 6B. The open channels 241a are open to one surface and/or to the environment for user access. Such an arrangement can allow for easier fitment of wiring or piping as discussed herein. FIG. 13 is shows a hanger 240b that includes an open plenum 241b in place of (or in addition to) the internal channels 247 shown in FIG. 6B. The open plenum 241b is open to one surface and/or to the environment for user access. Such an arrangement can allow for easier fitment of the wiring or piping as discussed herein. Further, in each of the embodiments of FIGS. 12 and 13, the wiring or piping, while not fully enclosed can still be protected by the hangers 240a, 240b. In some embodiments, covers, lids, or other similar structures may be provide to at least partially enclose the wiring or piping positioned in the open channels 241a and/or open plenum 241b.

Figure 14:
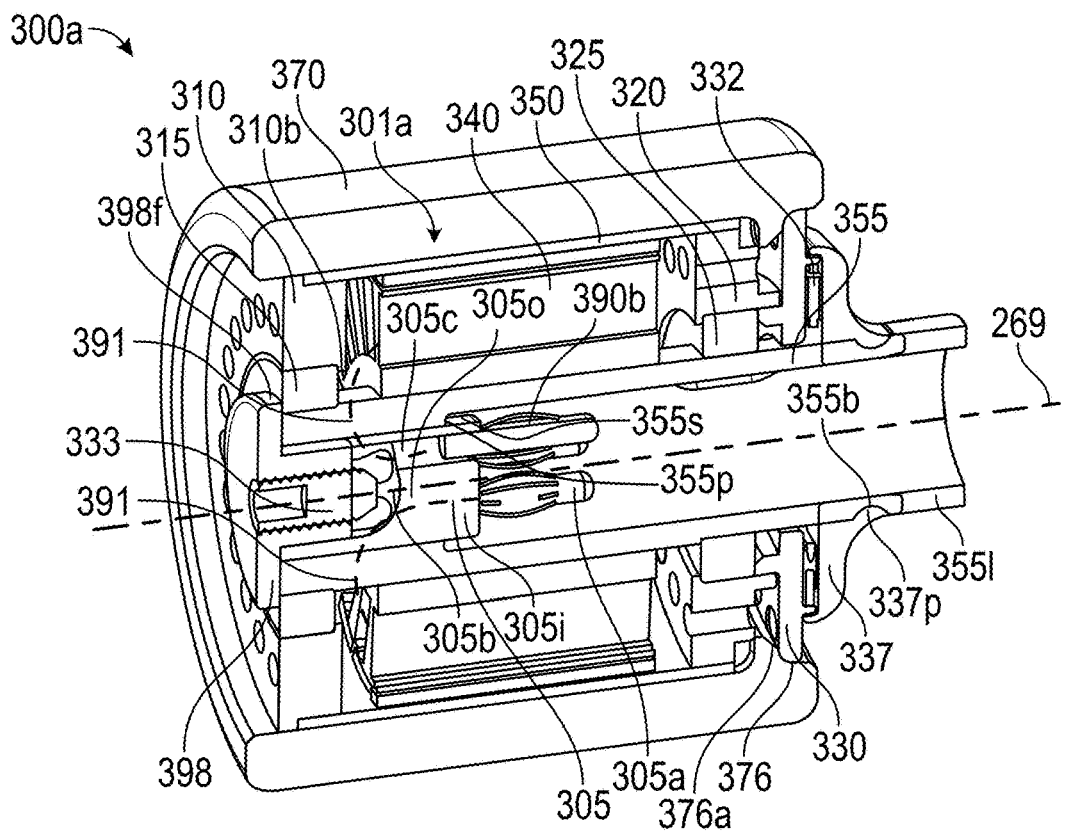
FIG. 14 is a cross-sectional perspective view of another embodiment of a motorized wheel.

FIG. 14 is a cross-sectional perspective view of another embodiment of a motorized wheel 300a. In many respects, the motorized wheel 300a is similar to the motorized wheel 300 discussed above, and description of similar features will not be repeated here. The motorized wheel 300a includes an electric motor 301a. The electric motor 301a includes an outer casing that is formed by an outer bell end 310, an outer surface of a rotor 350, and an inner bell end 320. The outer casing surrounds a stator 340. The stator 340 is mounted on a boss 355. The boss 355 is hollow. A portion 355l of the boss 355 extends beyond the inner bell end 320 away from the electric motor 301a. The boss 355 is configured to mount on an axle 260 that is itself mounted to a hanger 240. The boss 355 is connected to the outer bell end 310 by an outer bearing 315. Similarly, the boss 355 is further connected to the inner bell end 320 by an inner bearing 325. The bearings 315, 325 allow the outer casing of the electric motor 301a (in other words, the outer bell end 310, the rotor 350, and the inner bell end 320) to rotate relative to the boss 355 and the stator 340 (e.g., about the central axis 269). When the boss 355 is attached to the axle 260 of an electric vehicle, such as the motorized skateboard 100, the electric motor 301a can drive the tire 370, thus allowing the motorized wheel 300a to propel the motorized vehicle.

The outer bearing 315 is received within an opening in the outer bell end 310. A flange 310f is formed on the outer bell end 310 and configured to limit inward motion of the outer bearing 315. Thus, to install the outer bearing 315, the outer bearing 315 can be pressed into the corresponding opening on the outer bell end 310 until it contacts the flange 310f. A retainer 398 can be used to secure the outer bearing 315. The retainer 398 can include a flange 398f that limits outward motion of the bearing 315. Thus, when the retainer 398 is installed the outer bearing 315 is substantially constrained between the flange 398f of the retainer 398 and the flange 310f of the outer bell end 310. A fastener 333 can extend through the retainer 398. The fastener 333 can secure the retainer 398 in place.

The inner bearing 325 is received within an opening in the inner bell end 320. A flange 320f formed on the inner bell end 320 and configured to limit inward motion of the inner bearing 325. Thus, to install the inner bearing 325, the inner bearing 325 can be pressed into the corresponding opening on the inner bell end 320 until it contacts the flange 320f. When the motorized wheel 300a is installed on the axle 260, the inner bearing 325 can contact the hanger 240. The hanger 240 can thus limit outward motion of the inner bearing 325. When installed, the inner bearing 325 is thus substantially constrained between the flange 320f of the inner bell end 320 and the hanger 240.

A plug 305 is positioned within the boss 355. The plug 305 is positioned to engage and form an electrical connection (and/or other types of connections as described above) with a socket 290 positioned within the axle 260. In some embodiments, the plug 305 is pressed or glued within the boss 355. In some embodiments, mechanical fasteners (e.g., screws, bolts, etc.) can be used to retain the plug 305 within the boss 355. In some embodiments, the plug 305 can be connected to the boss 355 by any suitable or known process or processes, including permanent adhesive, thermal bonds, ultrasonic bonds, spot welds, i.e., thermal weld points, a stitch or stitches, strip welds, tacks formed by crimping, and/or press fit, shrink fit, sliding fit, interference fit, and/or snap fit mechanisms, including male and female parts (e.g., tongue-and-groove corresponding parts), and the like, including any combination thereof.

The boss 355 can be configured to receive the plug 305. As shown, the boss 355 can be hollow, and the plug 305 can be positioned within the hollow of the boss 355. In the illustrated embodiment, the boss 355 includes a flange 355*p* projecting inwardly from an inner surface of the boss 355. The flange 355*p* contacts the plug 305. An inside portion 305*i* of the plug 305 extends beyond the flange 355*p* toward the inner side of the electric motor 301*a* (toward the inner bell end 320). The inside portion 305*i* of the plug 305 is spaced apart from the inner surface of the boss 305. A receiving space 355*s* is formed between the inner surface of the boss 355, the flange 355*p*, and the inside portion 305*i* of the plug 305. When the motorized wheel 300*a* is installed onto the axle 260, the end of the axle 260 is received within the receiving space 355*s*. The flange 355*p* limits how far the motorized wheel 300*a* can be inserted onto the axle 260. When the motorized wheel 300*a* is installed onto the axle 260, the inside portion 305*i* of the plug 305 extends into the axle 260 such that the plug 305 can engage the socket 290. An outside portion 305*o* of the plug 305 can contact the inside surface of the boss 355. In some embodiments, an inner diameter of the boss 355 on the outside of the flange 355*p* is greater than an inner diameter of the boss 355 on the inside of the flange 355*p*. In some embodiments, the inner diameter of the boss 355 is substantially equal on both sides of the flange 355*p*.

As shown, the outside portion 305*o* of the plug 305 can include cutouts 305*b*. The cutouts 305*b* align with cutouts in the boss 355 (not shown). The cutouts 305*b* in the plug 305 and the cutouts in the boss 355 allow passage of wiring 391, tubing, or other structures between the plug 305 and the interior of the electric motor 301*a*. For example, wiring 391 from windings on the stator 340 can be electrically connected to the plug 305 via the cutouts 305*b*. In some embodiments, plug 305 can have one, two, three, four, six, seven, eight, nine or more prongs 305*a*. The prongs 305*a* can include spring portions 390*b* as described above.

Other types of plugs 305 and sockets 290 can also be used. In some embodiments, the plug 305 and socket 290 establish connections for other services (e.g., fluid connections for cooling fluids, lubricants, hydraulics, etc.) between the motorized wheel 300 and the axle 260. Thus, is some embodiments, the plug 305 and socket 290 are configured to establish fluid connections between the axle 260 and the electric motor 301*a*.

A portion 355*l* of the boss 355 extends from the inside of the electric motor 301*a* (in other words, extends away from the electric motor 301*a* from the inner bell end 320 and the inner bearing 325). The portion 355*l* includes a groove 355*b* formed therein. As will be described below, the groove 355*b* can be used to retain the tire 370 onto the electric motor 301*a*.

As shown, a tire 370 is mounted on the electric motor 301*a* such that the electric motor 301*a* drives the tire 370. In the illustrated embodiment of FIG. 14, the tire 370 and electric motor 301*a* are configured such that the tire 370 mounts from the inside side of the motorized wheel 300*a* (in other words, from the same side as the connection to the axle). Accordingly, the inner bell end 320 can include cutouts that engage the dogs (similar to those shown in FIGS. 10 and 11) on the tire 370. The tire 370 can be configured as described above, and can include a groove 376 and a flange 376*a*. The tire 370 is inserted onto the electric motor 301*a* until the flange 376*a* contacts the inner bell end 320. A retainer 330 then holds the tire 370 in place. The retainer 330 can be configured as described above with reference to FIGS. 9A and 9B, except that it is positioned on the inside of the motorized wheel 300*a*.

The retainer 330 is held in place by a collar 337, which presses a thrust bearing 332 into the retainer 330. The thrust bearing 332 can be configured as described above with reference to FIGS. 9A and 9B, except that it is positioned on the inside of the motorized wheel 300*a*. The collar 337 includes a protrusion 337*p*. The protrusion 337*p* engages the groove 355*b* on the boss 355 to retain the collar 337 in place. The thrust bearing 332 allows the retainer 330 to rotate with the tire 370, while the collar 337 remains stationary.

Figure 15A:
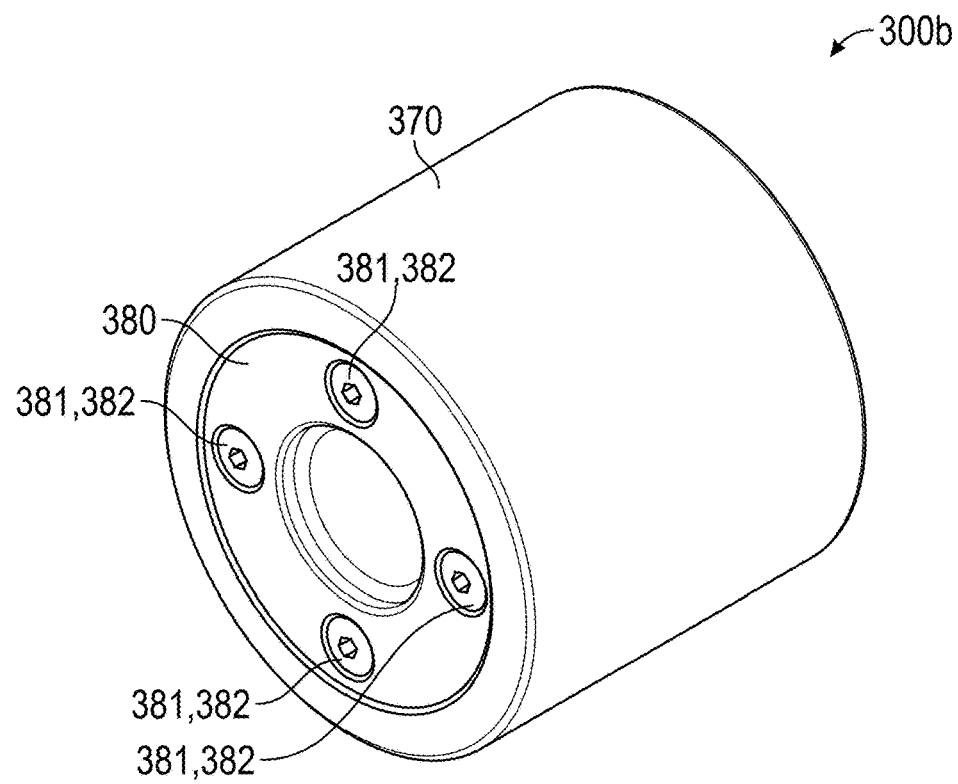
FIG. 15A is an outside perspective view of another embodiment of a motorized wheel.
Figure 15B:
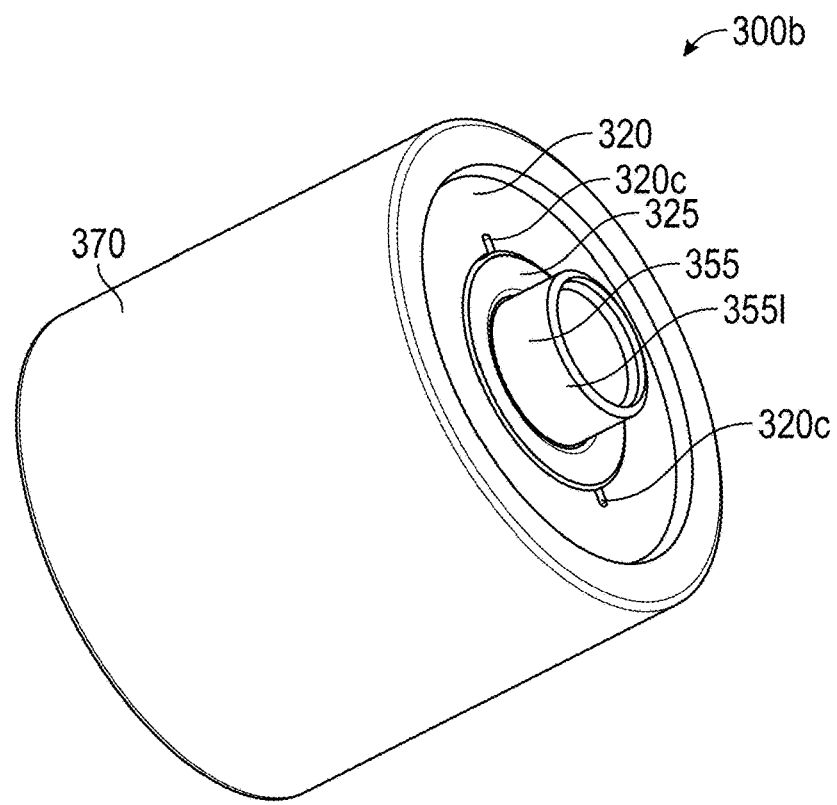
FIG. 15B is an inside perspective view of the motorized wheel of FIG. 15A.
Figure 15C:
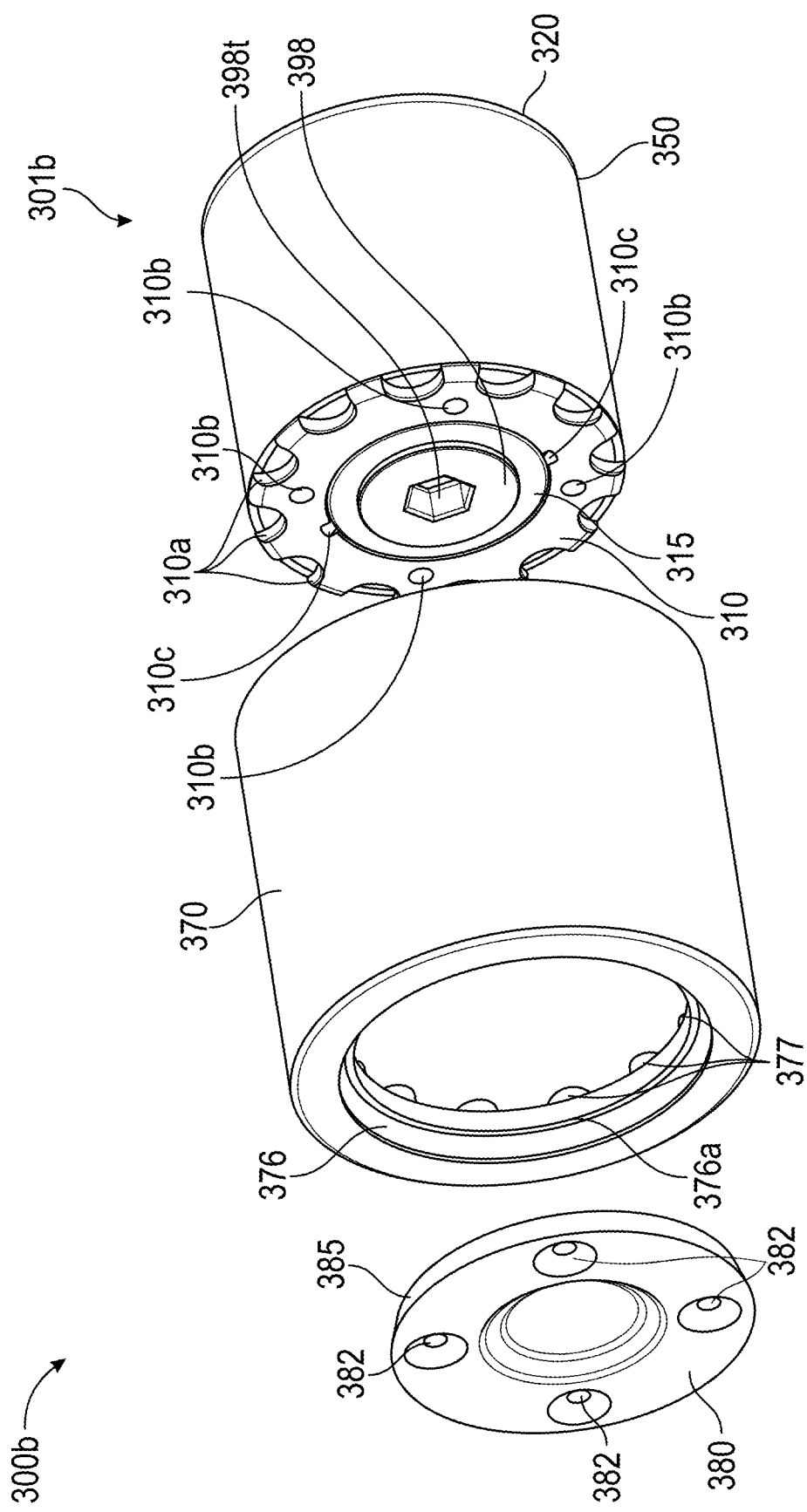
FIG. 15C is an exploded view of the motorized wheel of FIG. 15A.

FIGS. 15A and 15B are outside and inside perspective views, respectively, of another embodiment of a motorized wheel 300*b*. FIG. 15C is an exploded view of the motorized wheel 300*b*. In some aspects, the motorized wheel 300*b* is similar to the motorized wheel 300 (FIGS. 8A and 8B) and the motorized wheel 300*a* (FIG. 14) described above, with differences noted below. Description of some features of the motorized wheel 300*b* that are substantially similar to features of the motorized wheels 300, 300*a* will not be repeated here, with understanding that the previous description of those features with reference to the motorized wheels 300, 300*a* is applicable to the substantially similar features of the motorized wheel 300*b*.

The motorized wheel 300*b* includes a tire 370. The tire 370 is retained on an electric motor 301*b* (see the exploded view of FIG. 3C) by a cap 380. An embodiment of the electric motor 301*b* is shown in greater detail in FIGS. 16A-16C and described below. The cap 380 can be a hubcap. The cap 380 can be secured to the electric motor 301*b* by fasteners 381. The fasteners 381 can be mechanical fasteners, such as bolt fasteners, screw fasteners, clasps, locks, etc. In the illustrated embodiment, four bolts are shown, although other numbers and types of fasteners 381 are possible. The fasteners are inserted through corresponding openings 382 (see FIG. 3C) in the cap 380. In some embodiments, the fasteners 381 are configured to be tightened or loosened with tool, such as a screw driver, Allen wrench, wrench, or socket. In some embodiments, the fasteners 381 are configured to be tightened or loosened by hand, such as thumb screws, for example. In some embodiments, the fasteners 381 are flush with an outside face of the cap 380 when tightened. For example, heads of the fasteners 381 can be countersunk into the outside face of the cap 380.

The cap 380 can be a substantially flat disc shape as shown in FIG. 15C, although other shapes are possible. The cap 380 includes an outside face, an inside face, and a peripheral edge 385. The tire 370 can be configured as described above, and can include a groove 376 and a flange 376*a*. When assembled, the cap 380 is received within the groove 376. The peripheral edge 385 can contact the groove 376. A portion of the inside face of the cap 380 contacts the flange 376*a* to retain the tire 370 onto the electric motor 301*b*. The tire 370 includes dogs 377 (or similar features, such as pawls, bosses, protrusions, etc.). The dogs 377 on the tire 370 engage with corresponding cutouts 310*a* (or other similar features) on the outer bell end 310 of the electric motor 301*b*. This ensures that rotation of the electric motor 301*b* drives the tire 370.

In the illustrated embodiment of FIGS. 15A-15C, the tire 370 is configured to mount onto the electric motor 301*b* from the outside side (in other words, from the side of motorized wheel 300*b* opposite the connection to the axle). In some embodiments, the tire 370 can be configured to mount from the inside side of the motorized wheel 300*b* (in other words, from the same side as the connection to the axle). In such embodiments, the cutouts 310a (that engage the dogs 377) and openings 310b (that receive the fasteners 381 as described below) can be formed in the inner bell end 320. The cap 380 can include an opening configured to allow the axle to extend there through. In some embodiments, the cutouts 310a and openings 310b are included on both the inner bell end 320 and the outer bell end 310, such that the tire 370 can be mounted from either side of the motorized wheel 300b.

As seen in FIG. 15C, the outer bell end 310 includes openings 310b that are configured to receive the fasteners 381. The openings 310b can be aligned with the openings 382 on the cap 380. In some embodiments, the openings 310b are threaded to receive a corresponding threaded portion on the fasteners 381. Accordingly, the fasteners 381 extend through the openings 382 on the cap 380 and engage with the openings 310b on the outer bell end 310 to secure the cap 380 to the outer bell end 310. The cap 380 engages the tire 370 to secure the tire 370 to the electric motor 301b. Also shown in FIG. 15C, the outer bearing 315 is received within a corresponding opening in the outer bell end 310 and retained by a retainer 398. The retainer 398 can include an engagement structure 398t for engaging a tool useable to remove the retainer 398. The engagement structure 398t can be a recess. The recess can be configured in size and shape to receive a portion of the tool. For example, as illustrated, the engagement structure 398t is a hex-shaped recess configured to receive an Allen wrench.

The inner bell end 320, the inner bearing 325, and a portion 355l of the boss 355 of the electric motor 301b of the motorized wheel 300b are shown in FIG. 15B. The inner bearing 325 and the boss 355 can be substantially similar to corresponding features of the motorized wheel 300a, previously described. A portion 355l of the boss 355 extends beyond the inner bell end 320 and the inner bearing 325 (away from the electric motor 301b). As shown, the boss 355 can include an open end. The open end of the boss 355 is configured to receive an axle 260 (shown, for example, in FIGS. 17A-17C) of a motorized vehicle, such that the motorized wheel 300b can be mounted on the axle 260. The boss 355 will be described in more detail below with reference to FIGS. 16A-16C and FIGS. 17A-17C.

As shown in FIGS. 15B and 15C, bearing removal openings 310c, 320c are formed in the outer bell end 310 and inner bell end 320, respectively, as described below, the bearing removal openings 310c, 320c are configured to facilitate removal of the bearings 315, 325.

Figure 16A:
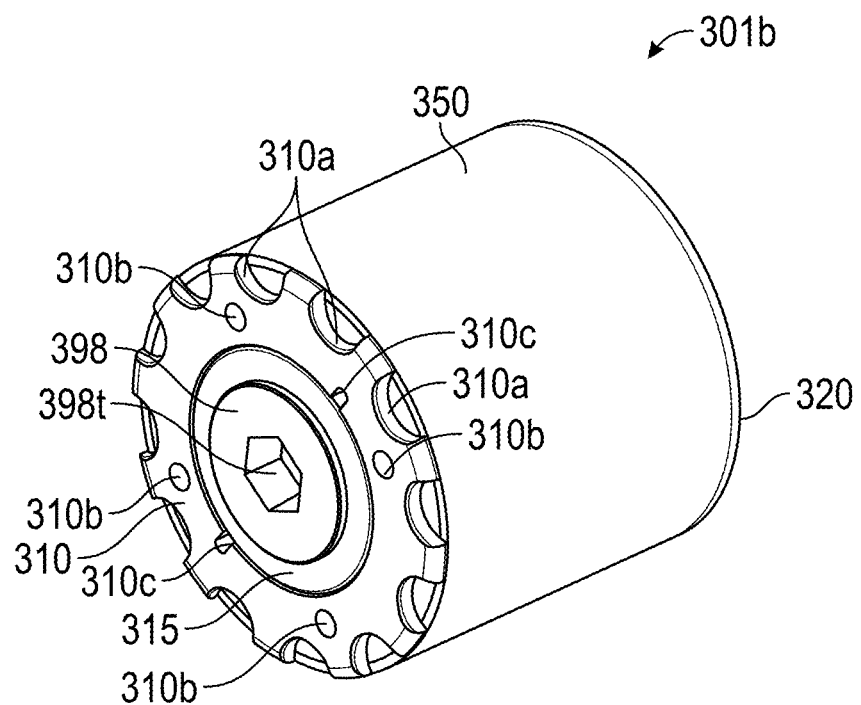
FIG. 16A is an outside perspective view of an embodiment of an electric motor.
Figure 16B:
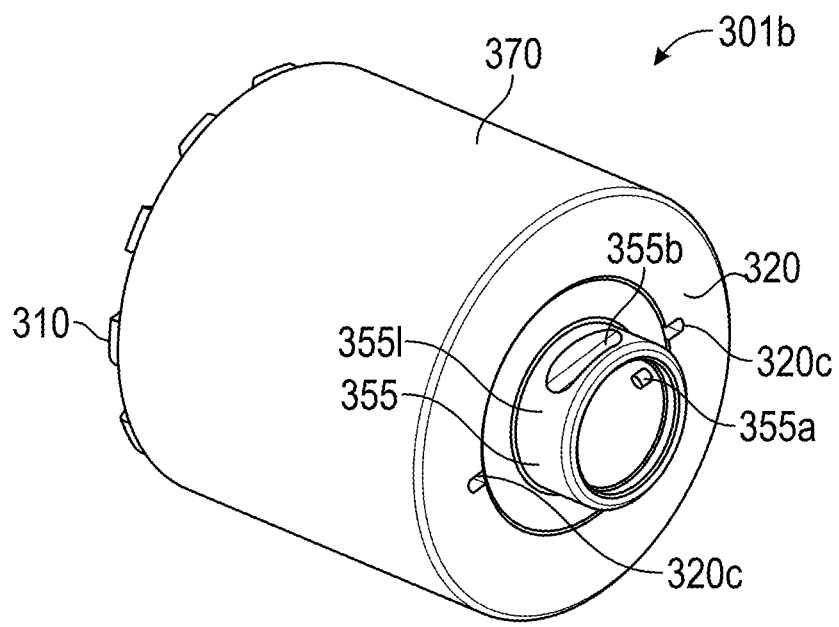
FIG. 16B is an inside perspective view of the electric motor of FIG. 16A.
Figure 16C:
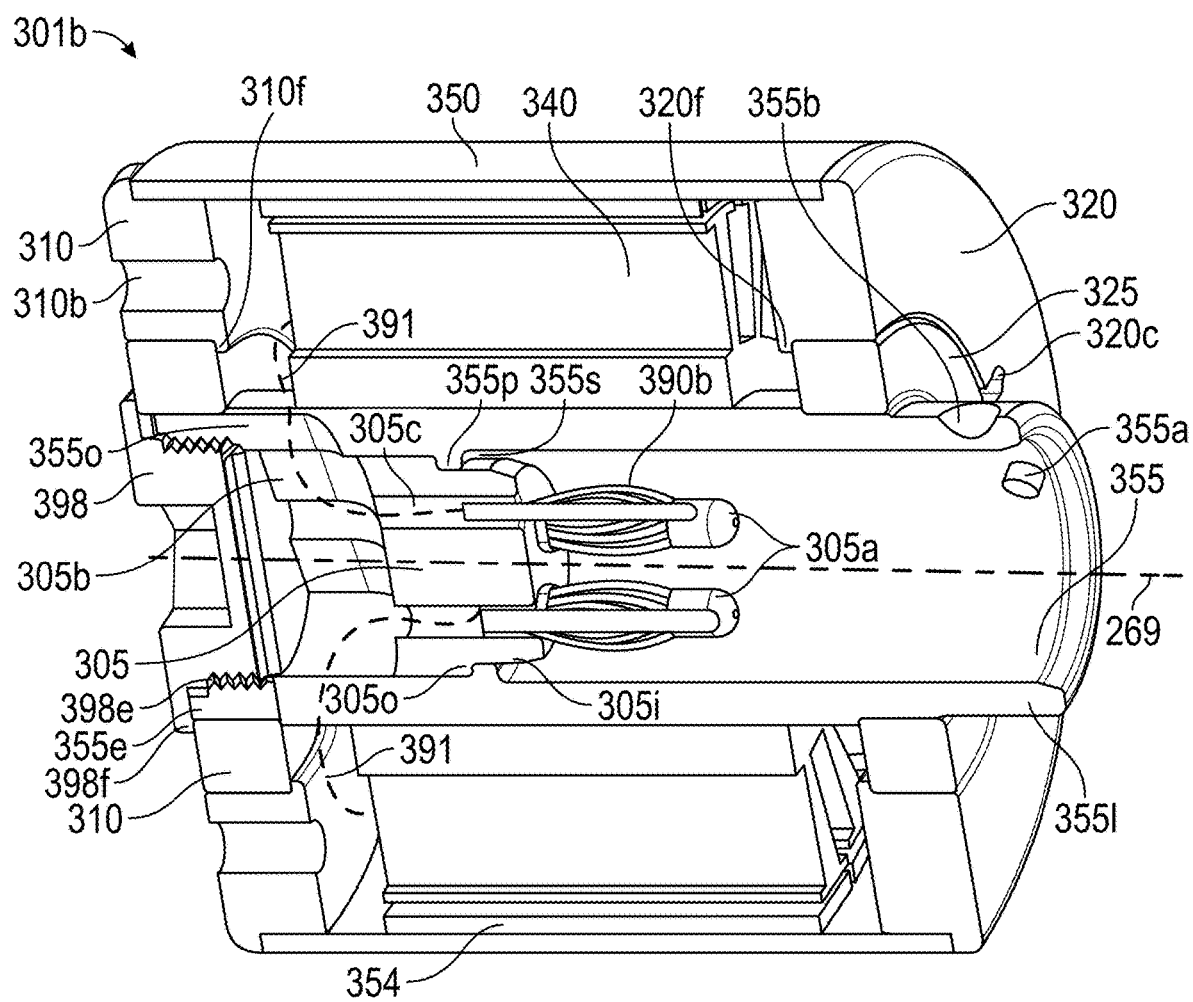
FIG. 16C is a cross-sectional perspective view of the electric motor of FIG. 16A.

An embodiment of an electric motor 301b that can be used, for example, in the motorized wheel 300b described above (as well as with other motorized wheels described throughout this application or elsewhere), is shown in FIGS. 16A-16C. FIGS. 16A and 16B are outside and inside perspective views, respectively, and FIG. 16C is a perspective cross-sectional view of the electric motor 301b. In some aspects, the electric motor 301b is similar to the electric motor 301 (FIGS. 8B and 10) described above, with differences noted below. Description of some features of the electric motor 301b that are substantially similar to features of the electric motor 301 will not be repeated here, with understanding that the previous description of those features with reference to the electric motor 301 is applicable to the substantially similar features of the electric motor 301b.

With reference to FIGS. 16A-16C, the electric motor 301b comprises an outer casing that is formed by an outer bell end 310, an outer surface of a rotor 350, and an inner bell end 320. The outer casing surrounds a stator 340 (FIG. 16C). The stator 340 is mounted on a boss 355. A portion 355l of the boss 355 extends beyond the inner bell end 320 (away from the electric motor 301b). The boss 355 is configured to mount on an axle 260 that is itself mounted in a hanger 240 (see for example, FIGS. 17A-17C). As will be described below, the portion 355l of the boss 355 may be received within a receiving space 258 of the hanger 240 (see FIGS. 17A-17C). The boss 355 is further connected to the outer bell end 310 by an outer bearing 315. Similarly, the boss 355 is further connected to the inner bell end 320 by an inner bearing 325. The bearings 315, 325 allow the outer casing of the electric motor 301b (in other words, the outer bell end 310, the rotor 350, and the inner bell end 320) to rotate relative to the boss 355 and the stator 340 (e.g., about the central axis 269). When the boss 355 is attached to the axle 260 of the motorized skateboard 100, the electric motor 301b can drive the tire 370, thus allowing the motorized wheel 300b to propel the motorized skateboard 100.

As shown in FIG. 16C, the outer bearing 315 is received within an opening in the outer bell end 310. A flange 310f is formed on the outer bell end 310 and configured to limit inward motion of the outer bearing 315. Thus, to install the outer bearing 315, the outer bearing 315 can be pressed into the corresponding opening on the outer bell end 310 until it contacts the flange 310f. A retainer 398 can be used to secure the outer bearing 315. The retainer 398 can include a flange 398f that limits outward motion of the bearing 315. Thus, when the retainer 398 is installed the bearing 315 is substantially constrained between the flange 398f of the retainer 398 and the flange 310f of the outer bell end 310. The outer end of the boss 355 can include a threaded portion 355e configured to engage with a corresponding threaded portion 398e of the retainer 398 to secure the retainer 398 to the boss 355. As noted previously, the retainer 398 also includes the engagement recess 398 configured to engage a tool. The tool can be used to tighten and loosen the retainer 398 to the boss 355. In some embodiments, the retainer 398 can be tightened or loosened by hand.

The inner bearing 325 is received within an opening in the inner bell end 320. A flange 320f is formed on the inner bell end 320 and configured to limit inward motion of the inner bearing 325. Thus, to install the inner bearing 325, the inner bearing 325 can be pressed into the corresponding opening on the inner bell end 320 until it contacts the flange 320f. When the motorized wheel 300a is installed on the axle 260, the inner bearing 325 can contact the hanger 240. In some embodiments, the hanger 240 includes a flange 257 (see FIG. 17C) that contacts the inner bearing 325. The hanger 240 thus limits outward motion of the inner bearing 325. When installed, the inner bearing 325 is thus substantially constrained between the flange 320f of the inner bell end 320 and the flange 257 of the hanger 240.

As shown in FIGS. 16A and 16B, bearing removal openings 310c, 320c are formed in the outer bell end 310 and inner bell end 320, respectively, as described below, the bearing removal openings 310c, 320c allow a tool to access and remove the bearings 315, 325. For example, a tool can be inserted through the bearing removal openings 310c, 320c and hooked around an inside edge of the bearings 315, 325. The tool can then be used to pull the bearings 315, 325 from their corresponding openings in the outer bell end 310 and the inner bell end 320. In some embodiments, the outer bearing 315 can only be removed when the retainer 398 is removed. In some embodiments, the inner bearing 325 can only be removed when the motorized wheel 300b is removed from the axle 260. These features allow a user to remove and replace the bearings 315, 325 without requiring substantial tooling, and can allow even novice users to perform the replacement themselves.

As shown in the cross-sectional view of FIG. 16C, a plug 305 is positioned within the boss 355. The plug 305 is positioned to engage and form an electrical connection (and/or other types of connections as described above) with a socket 290 positioned within the axle 260. In some embodiments, the plug 305 is pressed or glued within the boss 355. In some embodiments, mechanical fasteners (e.g., screws, bolts, etc.) can be used to retain the plug 305 within the boss 355. In some embodiments, the plug 305 can be connected to the boss 355 by any suitable or known process or processes, including permanent adhesive, thermal bonds, ultrasonic bonds, spot welds, i.e., thermal weld points, a stitch or stitches, strip welds, tacks formed by crimping, and/or press fit, shrink fit, sliding fit, interference fit, and/or snap fit mechanisms, including male and female parts (e.g., tongue-and-groove corresponding parts), and the like, including any combination thereof.

The boss 355 can be configured to receive the plug 305. As shown, the boss 355 can be hollow, and the plug 305 can be positioned within the hollow of the boss 355. In the illustrated embodiment, the boss 355 includes a flange 355$p$ projecting inwardly from an inner surface of the boss 355. The flange 355$p$ contacts the plug 305. An inside portion 305$i$ of the plug 305 extends beyond the flange 355$p$ toward the inner side of the electric motor 301$b$ (towards the inner bell end 320). The inside portion 305$i$ of the plug 305 is spaced apart from the inner surface of the boss 355. A receiving space 355$s$ is formed between the inner surface of the boss 355, the flange 355$p$ and the inside portion 305$i$ of the plug 305. When the motorized wheel 300$b$ is installed onto the axle 260, the end of the axle 260 is received within the receiving space 355$s$. The flange 355$p$ limits how far the motorized wheel 300$b$ can be inserted onto the axle 260. When the motorized wheel 300$b$ is installed onto the axle 260, the inside portion 305$i$ of the plug 305 extends into the axle 260 such that the plug 305 can engage the socket 290. An outside portion 305$o$ of the plug 305 can contact the inside surface of the boss 355. In some embodiments, an inner diameter of the boss 355 on the outside of the flange 355$p$ is greater than an inner diameter of the boss 355 on the inside of the flange 355$p$. In some embodiments, the inner diameter of the boss 355 is substantially equal on both sides of the flange 355$p$. In some embodiments, the flange 355$p$ extends from the plug 305 rather than the boss 355.

As shown, the outside portion 305$o$ of the plug 305 can include cutouts 305$b$. The cutouts 305$b$ align with cutouts 355$o$ in the boss 355. The cutouts 305$b$ in the plug 305 and the cutouts 355$o$ in the boss 355 allow passage of wiring 391, tubing, or other structures between the plug 305 and the interior of the electric motor 301$b$. For example, wiring 391 from windings on the stator 340 can be electrically connected to the plug 305 via the cutouts 305$b$, 355$o$. In some embodiments, plug 305 can have one, two, three, four, six, seven, eight, nine or more prongs 305$a$. The prongs 305$a$ can include spring portions 390$b$ as described above. Wiring 391 (illustrated by dashed lines) or other connection can be run between the plug 305 and the interior of the electric motor 301$b$. For example, as shown in FIG. 16C, wiring 391 connects the prongs 305$a$ of the plug 305 to the windings on the stator 340.

Other types of plugs 305 and sockets 290 can also be used. In some embodiments, the plug 305 and socket 290 establish connections for other services (e.g., fluid connections for cooling fluids, lubricants, hydraulics, etc.) between the motorized wheel 300$b$ and the axle 260. Thus, is some embodiments, the plug 305 and socket 290 are configured to establish fluid connections between the axle 260 and the electric motor 301$b$.

As shown in FIGS. 16B and 16C, a portion 355$l$ of the boss 355 extends from the inside of the electric motor 301$b$ (in other words, extends away from the electric motor 301$b$ from the inner bell end 320 and the inner bearing 325). As shown, the portion 355$l$ of the boss 355 can include a groove 355$b$ formed in an outside or outer surface of the portion 355$l$. In some embodiments, the groove 355$b$ extends in a direction perpendicular to the longitudinal axis of the boss 355. The portion 355$l$ can also include a projection 355$a$. The projection 355$a$ extends from the inner surface of the boss 355. In some embodiments, the projection 355$a$ can be a pin, guide, boss, etc. In some embodiments, the projection 355$a$ is a grub screw engaged with a hole in the boss 355. The grub screw can be advanced such that a portion of the grub screw extends into the hollow of the boss 355. The portion 355$l$ of the boss 355, the groove 355$b$, and the projection 355$a$ can form a part of a quick connect system for the motorized wheel 300$b$ as will be described below.

Figure 17A:
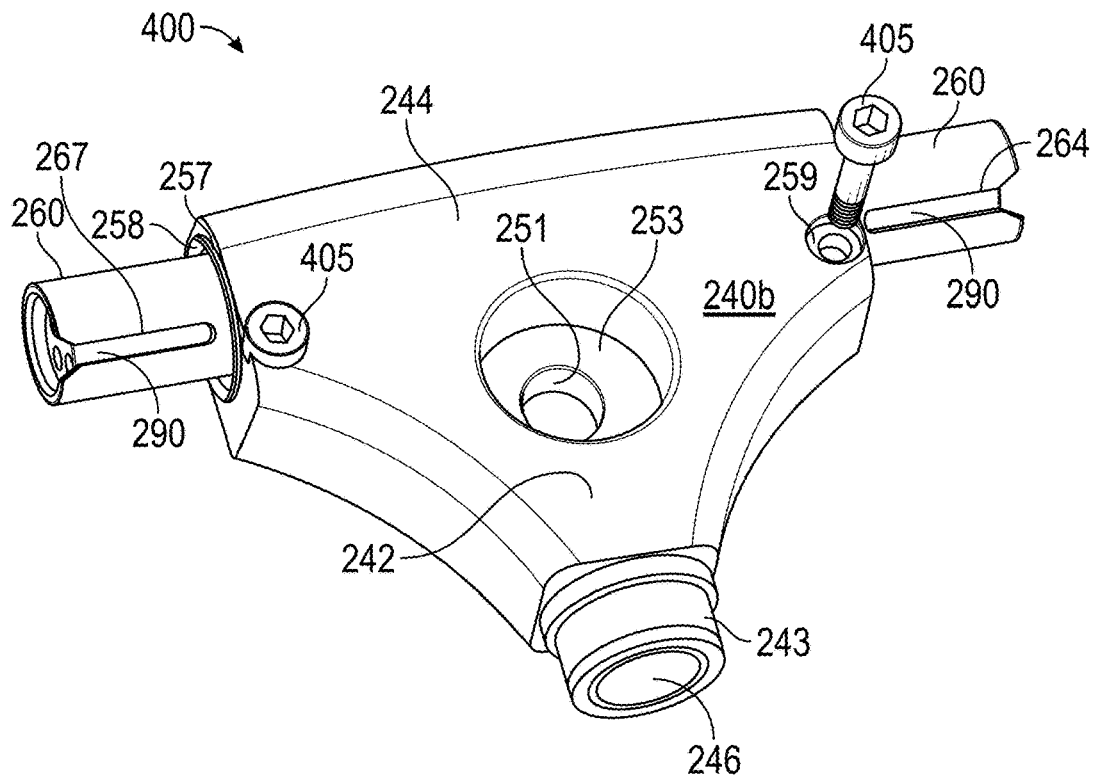
FIG. 17A is a perspective view of an embodiment of a hanger and axle assembly.
Figure 17B:
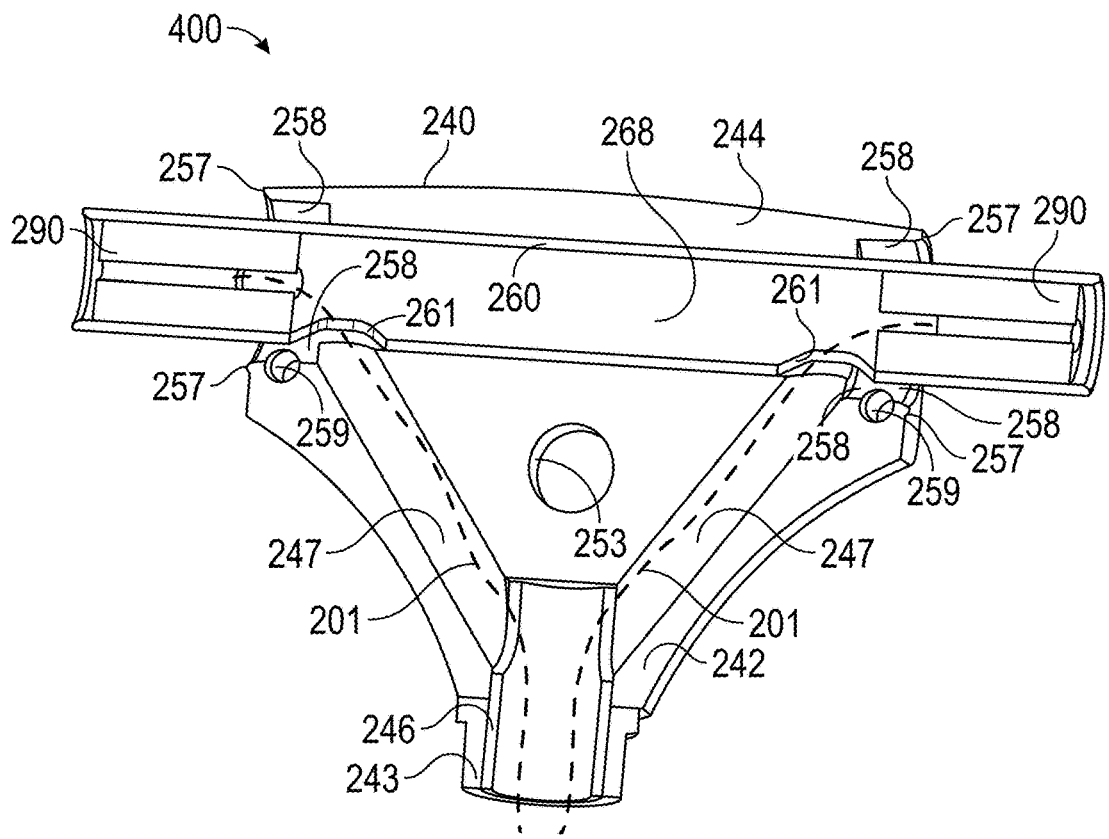
FIG. 17B is a cross-sectional perspective view of the hanger and axle assembly of FIG. 17A.
Figure 17C:
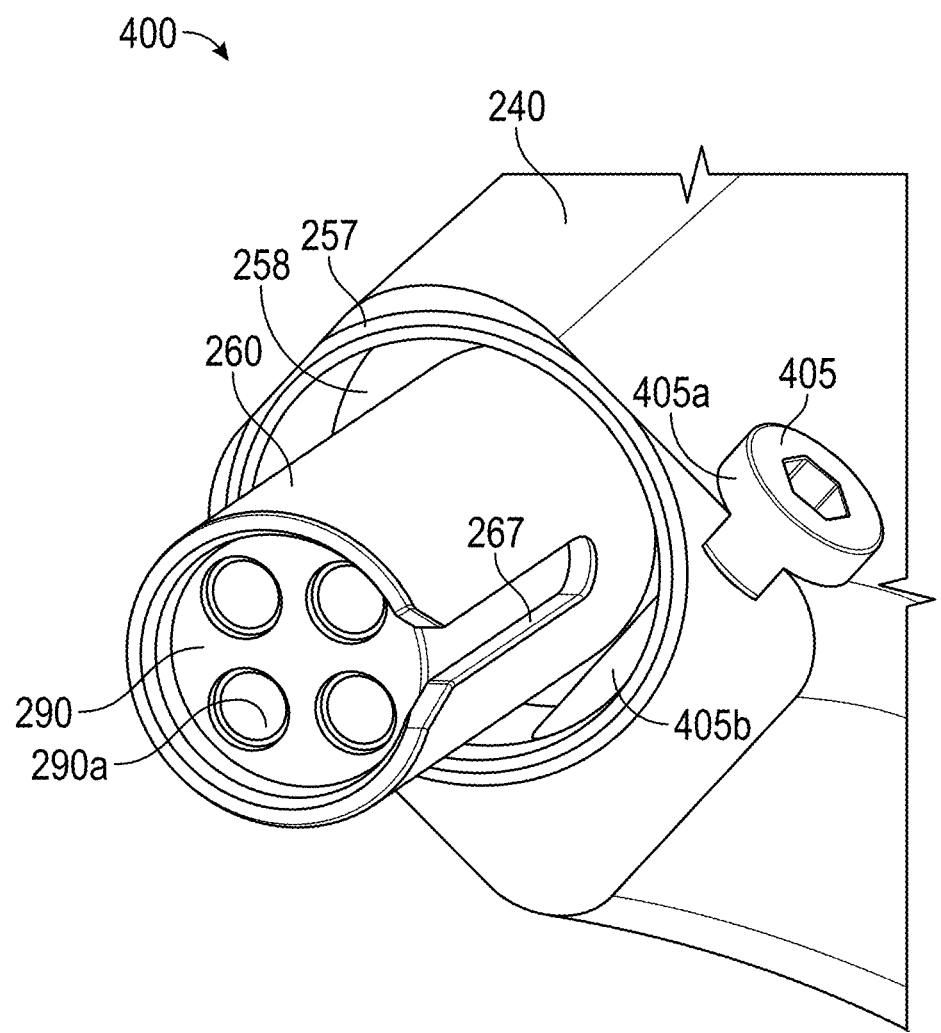
FIG. 17C is a detail view of one end of the hanger and axle assembly of FIG. 17A.

FIG. 17A is a perspective view of an embodiment of a hanger and axle assembly 400. FIG. 17B is a cross-sectional perspective view of the hanger and axle assembly 400, and FIG. 17C is a detail view of one end of the hanger and axle assembly 400. In some embodiments, the hanger and axle assembly 400 is configured for use with the motorized wheel 300$b$ (including the electric motor 301$b$) described above (FIGS. 15A-16C), although use with other motorized wheels (or non-motorized wheels) is possible. The hanger and axle assembly 400 includes a hanger 240 and an axle 260.

In some aspects, the hanger 240 and axle 260 of the assembly 400 are similar to the hangers 240 and axles 260 described above, with differences noted below. Description of some features of the hanger 240 and axle 260 of the assembly 400 that are substantially similar to features described above may not be repeated here, with understanding that the previous description of those features is applicable to the features of the hanger 240 and axle 260 of the assembly 400.

The axle 260 is mounted to the hanger 240. The axle 260 is received in an axle portion 244 of the hanger 240. In some embodiments, the axle 260 may be pressed or glued into the axle portion 244. In the illustrated embodiment, the axle 260 is hollow and includes a channel 268 formed therein. The axle 260 and the channel 268 can extend along a central axis (similar to the axis 269 shown in FIG. 5). Axle openings 261 in the wall of the axle 260 are aligned with channels 247 in the hanger 240. In the illustrated embodiment, two axle openings 261 are included that align with the two hanger channels 247. In some embodiments, only a single channel 247 and a single axle opening 261 are included. In some embodiments, more than two channels 247 and axle openings 261 are included.

A pivot portion 242 of the hanger 240 allows for resilient connection between the hanger 240 and a truck 210 (for example, as shown in FIGS. 7A and 7B) to allow for steering, as described above. For example, the pivot portion 242 includes a pivot bushing 243. The pivot bushing 243 provides a pivot point between the pivot portion 242 of the hanger 240 and the truck 210. A pivot tube 246 extends through the pivot portion 242 and the pivot bushing 243. The pivot tube 246 is hollow. In some embodiments, the pivot tube 246 is rigid. In some embodiments, the pivot tube 246 is flexible. Openings through the walls of the pivot tube 246 are connected to channels 247 that extend through the hanger 240. In the illustrated embodiment, a first channel 247 extends through the hanger 240 on a first side of a kingpin opening 251, and a second channel 247 extends through the hanger 240 on a second side of the kingpin opening 251. A recess 253 may extend into the hanger 240 around the kingpin opening 251.

Similar to the hangers 240 and axles 260 previously described (for example, with reference to FIGS. 3-6A), the hanger 240 and axle 260 of the assembly 400 are configured with a duct or passageway 201 (illustrated with dashed lines in FIG. 17B) for routing wiring, tubing, or other structures between an electric vehicle and sockets 290 positioned within the hollow channel 268 of the axle 260. The duct or passageway 201 can be formed by the pivot tube 246, channels 247 of the hanger 240, and channel 268 of the axle 260.

In some embodiments, the sockets 290 are pressed or glued into the axle 260. In some embodiments, mechanical fasteners (e.g., bolts, screws, etc.) are used to fix the sockets 290 within the axle 260. In some embodiments, the sockets 290 can be connected to the axle 260 by any suitable or known process or processes, including permanent adhesive, thermal bonds, ultrasonic bonds, spot welds, i.e., thermal weld points, a stitch or stitches, strip welds, tacks formed by crimping, and/or press fit, shrink fit, sliding fit, interference fit, and/or snap fit mechanisms, including male and female parts (e.g., tongue-and-groove corresponding parts), and the like, including any combination thereof. The sockets 290 are configured to mate with plugs 305 on the motorized wheels 300b to establish an electrical (and/or other type of) connection therebetween. The sockets 290 can be configured to allow for quick release of the motorized wheels 300b such that the connection between plug 305 and socket 290 is automatically made when the motorized wheels 300b are installed on the axle 260.

The hanger and axle assembly 400 can include features for a quick connect system for installing the motorized wheels 300b on the axle 260. For example, as best seen in FIG. 17B, the hanger 240 includes a receiving space 258 surrounding the axle 260 at the locations where the axle 260 extends outwardly from the hanger 240. The receiving space 258 is configured to receive the portion 355l of the boss 355 when the motorized wheel 300b is installed onto the axle 260, that is, when the axle 260 is inserted into the hollow of the boss 355. A flange 257 may surround the receiving space 258. The flange 257 can contact the inner bearing 325 when the motorized wheel 300b is installed on the axle 260. The hanger 240 also includes bores 259 extending therethrough. The bores 259 partially intersect the receiving space 258. The bores 259 are configured to receive pins 405 (rods, screws, bolts, etc.). When each pin 405 is inserted into the channels 268, a portion 405b of the pin 405 is positioned within the receiving space 258 (see FIG. 17C). When the motorized wheel 300b is installed on the axle 260, the portion 405b of the pin 405 is partially received within the groove 355b in the portion 355l of the boss 355. Engagement between the pin 405b and the groove 355b prevents the motorized wheel 300b from being removed from the axle 260 until the pin 405b is removed.

In some embodiments a portion of the bores 259 and a portion of the pins 405 are threaded, such that the pins 405 can be screwed into the bores 259. The pins 405 can include a head portion 405a. The head portion 405a can include features for engaging a tool (such as a screw driver, Allen wrench, wrench, or socket) for tightening and loosening the pins 405. In some embodiments, the pins 405 are configured to be tightened and loosened by hand (for example, thumb screws or similar).

In the illustrated embodiment, each end of the axle 260 also includes a slot 267. The slot 267 can be configured to engage with the projection 355a of the portion 355l of the boss 355. In some embodiments, engagement of the projection 355a with the slot 267 can ensure proper alignment between the plug 305 and the socket 290, by, for example, ensuring alignment between the prongs 305a and the receptacles 290a. This can prevent an improper connection between the plug 305 and the socket 290. Further, engagement of the projection 355a with the slot 267 can ensure proper alignment between the groove 355b and the pin 405.

Thus, the motorized wheel 300b can be retained on the axle 260 using the quick connect system. For example, the end of the axle 260 is inserted into the hollow of the boss 355. To insert the axle 260 into the hollow of the boss 355, the user can align the projection 355a with the slot 267. Once aligned, the axle 260 can be slid within the hollow of the boss 355, with the projection 355a sliding along the slot 267. As the axle 260 is inserted into the boss 355, prongs 305a of the plug 305 enter and establish a connection with the receptacles 290a of the socket. Engagement between the projection 305a and the slot 267 ensures that the plug 305 and socket 290 are properly aligned. As the axle 260 slides into the boss 355, the portion 355l of the boss 355 is received within the receiving space 258. At the same time, the end of the axle 260 is received within receiving space 355s within the boss 355. To retain the motorized wheel 300b on the axle 260, the pin 405 is inserted into the bore 259. The pin 405 engages the groove 355b. Engagement between the projection 355a and the slot 267 ensures that the pin 405 and the groove 355b are properly aligned. The pin 405 can be tightened to secure the pin 405, thus retaining the motorized wheel 300b on the axle.

To remove the motorized wheel 300b, the pin 405 is loosened and removed. The motorized wheel 300b can then slide off the axle 260.

The color, embellishments, and exterior decoration of the motorized wheel assemblies and motorized wheels are not relevant to the function, and may be of any style the market desires.

Although, shown with the example of the skateboard 100, the motorized wheel assemblies and motorized wheels described herein can be also useful for other weight and/or space sensitive wheeled sports applications, including road luge, roller skates, inline skates, grass skiing, and small wheeled scooters, among others types of vehicles. As used herein, a vehicle is a platform which may be used for the transport of goods and/or people. Small wheeled vehicles can include electric warehouse and factory cars, buggies, autonomous vehicles, skateboards, scooters, roller skates and street luge. Vehicles may be unpowered, for example, as in the case of most skateboards, roller skates and street luge, or may have one or more wheels driven by electric motors. Powered vehicles can include electric vehicles, where the power supply is usually a battery, and can also include vehicles such as slot cars, dodgem cars, tracked vehicles and trams, where a sliding contact, often a pantograph, is used to connect the vehicle to a fixed power supply such as overhead electrified mesh, wire or rails. The motorized skateboard 100 and/or motorized wheel assemblies and motorized wheels may have beneficial application in last leg commuting vehicles because it is both powered and lightweight. A last leg commuting vehicle is one that can be hand carried, or slung from a backpack, then used to transport the user from a train, plane, tram, or other public transport system, to their final destination.

It is contemplated that various combinations or sub combinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the inventions are susceptible to various modifications, and alternative forms, specific examples thereof have been shown in the drawings and are herein described in detail. It should be understood, however, that the inventions are not to be limited to the particular forms or methods disclosed, but to the contrary, the inventions are to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "passing a suspension line through the base of the tongue" include "instructing the passing of a suspension line through the base of the tongue." It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. The ranges disclosed herein also encompass any and all overlap, sub-ranges, and combinations thereof. Language such as "up to," "at least," "greater than," "less than," "between," and the like includes the number recited. Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of the stated amount. Features of embodiments disclosed herein preceded by a term such as "approximately," "about," and "substantially" as used herein represent the feature with some variability that still performs a desired function or achieves a desired result for that feature.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

What is claimed is:

1. A powered motorized board, comprising:
   a motorized board deck having an internal housing or cavity configured to store one or more electrical components;
   a motorized board truck disposed on a bottom portion of the motorized board deck;
   a motorized wheel attached to the board truck and controlled by the one or more electrical components stored in the board deck, the motorized wheel configured to move the powered motorized board at a speed, wherein the motorized wheel comprises:

a hub motor having a stator portion disposed at a fixed position relative to an axle of the motorized board truck;
a wheel portion configured to rotate about the stator portion; and
a releasable retainer or cap configured to secure the wheel portion onto the motorized wheel; and
a motorized wheel adaptor configured to be disposed on the axle of the motorized board truck and to facilitate securing of the stator portion in fixed position onto the motorized wheel adaptor,
wherein the motorized wheel adaptor comprises a boss configured to be fixed relative to the axle of the motorized board truck.

2. The powered motorized board of claim 1, wherein the one or more electrical components comprise:
a battery for providing power to the motorized wheel; and
a controller for controlling the speed of the motorized wheel.

3. The powered motorized board of claim 1, wherein the motorized wheel further comprises:
an inner bearing positioned on the motorized wheel adaptor; and
an inner bell end positioned on the inner bearing, the inner bell end further connected to a rotor portion,
wherein a portion of the motorized wheel adaptor extends outwardly away from the inner bearing and the inner bell end.

4. The powered motorized board of claim 3, wherein the motorized wheel further comprises:
an outer bell end connected to the rotor portion, the outer bell end including an opening; and
an outer bearing positioned proximate the motorized wheel adaptor, the outer bearing received within the opening of the outer bell end,
wherein the retainer or cap is configured to secure the outer bell end relative to the motorized wheel adaptor.

5. The powered motorized board of claim 1, wherein the powered motorized board comprises a skateboard.

6. The powered motorized board of claim 1, wherein a controller is configured to, at least, control the motorized wheel based on a control signal.

7. The powered motorized board of claim 1, wherein the motorized board deck comprises a tapered boat hull shape.

8. The powered motorized board of claim 1, wherein the housing comprises the cavity.

9. The powered motorized board of claim 1, wherein the powered motorized board comprises a skateboard.

10. The powered motorized board of claim 1, further comprising wiring connecting the one or more electrical components to the hub motor, wherein the wiring is routed inside the board deck from the one or more electrical components to the hub motor.

11. The powered motorized board of claim 10, wherein the wiring is routed inside the board truck from the one or more electrical components to the hub motor.

12. A method of making a powered motorized board, comprising:
providing a motorized board deck having an internal housing or cavity configured to store one or more electrical components;
attaching a motorized board truck to a bottom portion of the motorized board deck; and
attaching a motorized wheel to the motorized board truck, the motorized wheel being controlled by the one or more electrical components stored in the motorized board deck and configured to move the powered motorized board at a speed, wherein the motorized wheel comprises:
a hub motor having a stator portion disposed at a fixed position relative to an axle of the motorized board truck;
a wheel portion configured to rotate about the stator portion; and
a releasable retainer or cap configured to secure the wheel portion onto the motorized wheel; and
installing a motorized wheel adaptor onto on the axle of the motorized board truck, the motorized wheel adapter configured to facilitate securing of the stator portion in fixed position onto the motorized wheel adaptor,
wherein the motorized wheel adaptor comprises a boss configured to be fixed relative to the axle of the motorized board truck.

13. The method of claim 12, wherein providing a motorized board having an internal housing or cavity configured to store one or more electrical components, comprises:
storing a battery in the internal housing or cavity of the motorized board deck, the battery configured to provide power to the motorized wheel; and
installing a controller in the internal housing or cavity of the motorized board deck, the controller configured to control the speed of the motorized wheel.

14. The method of claim 12, wherein the motorized wheel further comprises:
an inner bearing positioned on the motorized wheel adaptor; and
an inner bell end positioned on the inner bearing, the inner bell end further connected to a rotor portion,
wherein a portion of the motorized wheel adaptor extends outwardly away from the inner bearing and the inner bell end.

15. The method of claim 14, wherein the motorized wheel further comprises:
an outer bell end connected to the rotor portion, the outer bell end including an opening; and
an outer bearing positioned proximate the motorized wheel adaptor, the outer bearing received within the opening of the outer bell end,
wherein the retainer or cap is configured to secure the outer bell end relative to the motorized wheel adaptor.

16. The method of claim 12, wherein the powered motorized board comprises a skateboard.

17. The method of claim 12, wherein a controller is configured to, at least, control the motorized wheel based on a control signal.

18. The method of claim 12, wherein the motorized board deck comprises a tapered boat hull shape.

19. The method of claim 12, wherein the housing comprises the cavity.

20. The method of claim 12, wherein the powered motorized board comprises a skateboard.

21. The method of claim 12, further comprising wiring inside the board deck the one or more electrical components to the hub motor.

22. The method of claim 21, further comprising wiring inside the board truck the one or more electrical components to the hub motor.

* * * * *